(12) United States Patent
Deck et al.

(10) Patent No.: US 10,392,131 B2
(45) Date of Patent: Aug. 27, 2019

(54) ADDITIVE MANUFACTURED TOOL ASSEMBLY

(71) Applicant: THE BOEING COMPANY, Chicago, IL (US)

(72) Inventors: Eric Eldon Deck, Ladue, MO (US); Michael Palmore Matlack, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 176 days.

(21) Appl. No.: 15/331,010

(22) Filed: Oct. 21, 2016

(65) Prior Publication Data

US 2018/0057188 A1 Mar. 1, 2018

Related U.S. Application Data

(60) Provisional application No. 62/379,935, filed on Aug. 26, 2016.

(51) Int. Cl.
*B64F 5/00* (2017.01)
*F16M 11/42* (2006.01)
(Continued)

(52) U.S. Cl.
CPC .............. *B64F 5/10* (2017.01); *B25B 11/007* (2013.01); *B33Y 80/00* (2014.12); *F16M 11/42* (2013.01)

(58) Field of Classification Search
CPC ........... B64F 5/10; F16M 11/42; B33Y 80/00; B25B 11/007
See application file for complete search history.

(56) References Cited

U.S. PATENT DOCUMENTS

2005/0084344 A1 4/2005 Dods et al.
2007/0107189 A1* 5/2007 Prichard ............... B29C 33/307
29/448
(Continued)

FOREIGN PATENT DOCUMENTS

EP 1780120 A2 5/2007
WO 2007034197 A1 3/2007
(Continued)

OTHER PUBLICATIONS

Tyler Koslow; ORNL and Boeing Earn Guinness Book of Work Records Title for Largest Solid 3D Printed Part; Aug. 29, 2016; 13 pages.
(Continued)

*Primary Examiner* — John C Hong
(74) *Attorney, Agent, or Firm* — Jay J. Hoette; The Small Patent Law Group, LLC

(57) ABSTRACT

A tool assembly includes a support frame including support beams and support mounts supporting the support beams. The support frame is rigid and used to transport the tool assembly. A support tool is supported by the support frame and includes a faceplate and a supporting grid structure formed with the faceplate as a monolithic structure defined by a series of AM layers. The faceplate has a supporting surface at a top of the support tool for supporting a working component. The supporting grid structure engages the support beams such that loads are transferred between the support tool and the support frame through the support beams. The support frame maintains dimensional stability of the support tool during transport and when resting within an allowable tolerance of the support tool.

29 Claims, 17 Drawing Sheets

(51) Int. Cl.
*B64F 5/10* (2017.01)
*B33Y 80/00* (2015.01)
*B25B 11/00* (2006.01)

(56) References Cited

U.S. PATENT DOCUMENTS

2009/0056109 A1* 3/2009 Prichard ............... B29C 33/307
29/701
2014/0328655 A1 11/2014 Nou et al.
2015/0367579 A1 12/2015 Laudrain

FOREIGN PATENT DOCUMENTS

WO 2014158853 A1 10/2014
WO 2015162406 A2 10/2015

OTHER PUBLICATIONS

Sara Shoemaker; 3D printed tool for building aircraft achieves Guinness World Records Title; Aug. 29, 2016; 5 pages.
Extended European Search Report for corresponding EP Application No. 17174588.8-1754 dated Dec. 15, 2017 (6 pages).

* cited by examiner

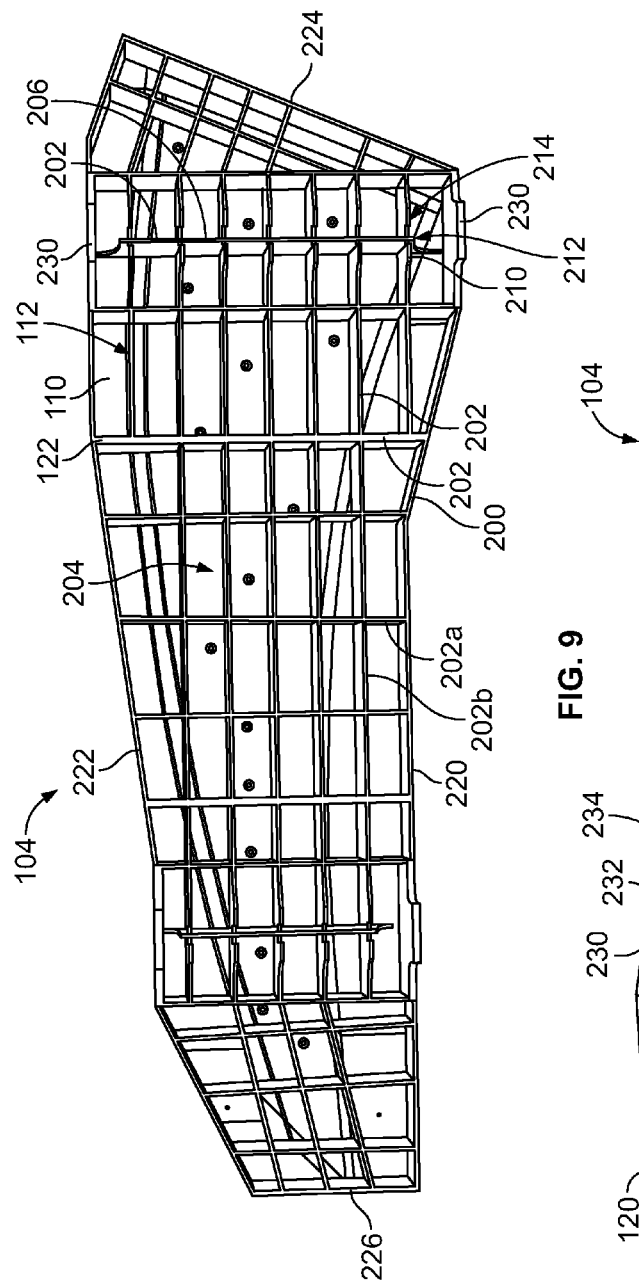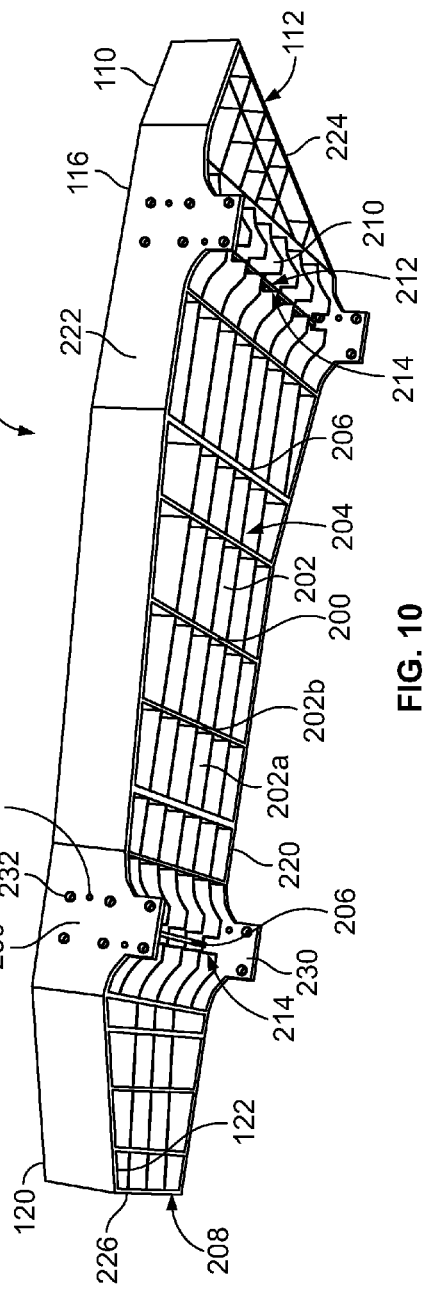
FIG. 9
FIG. 10

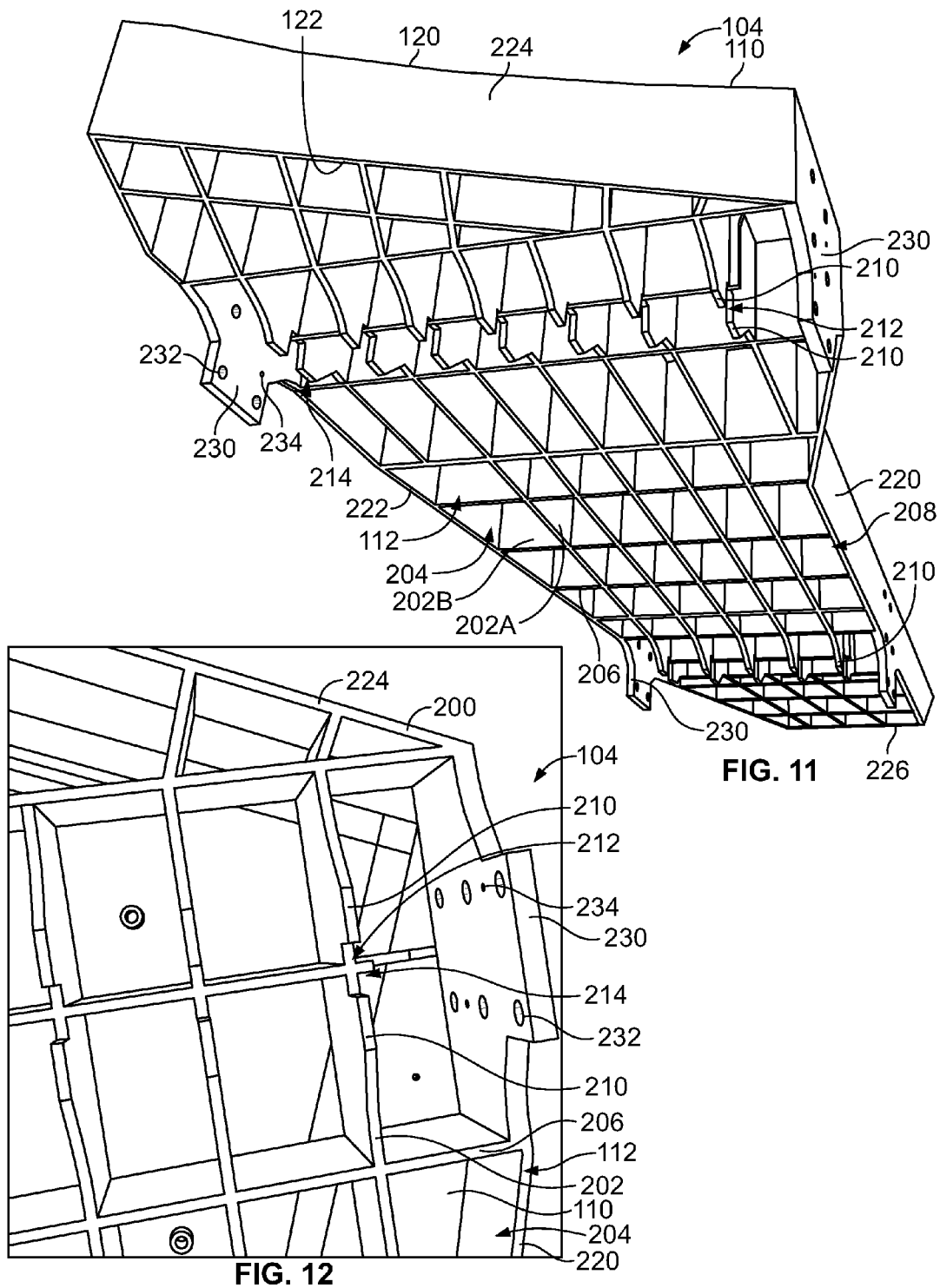

ADDITIVE MANUFACTURED TOOL ASSEMBLY

CROSS REFERENCE TO RELATED APPLICATIONS

This application claims the benefit of U.S. Provisional Application No. 62/379,935 filed Aug. 26, 2016, the subject matter of which is herein incorporated by reference in its entirety.

BACKGROUND

The present disclosure relates generally to additive manufactured support tools.

Support tools for manufacturing working components, such as composite aircraft parts, require custom surfaces to be generated using the support tool to support the working component. For example, during a trimming process, the working component is held in a fixture so the edges of the part can be trimmed. However, in some applications, such as in aircraft applications, the working components are very large. For example, wing components, such as the leading edge, the flaps, or other parts of the wing or fuselage of the aircraft are to be trimmed. Such components have a large surface area. To support the large working component, the support tool should be at least as large as the component.

Typically, the support tool is a large, metal plate-type support tool having a contoured surface matching the contoured surface of the component machined into the metal plate. The upper metal plate must be sufficiently thick to accommodate the contoured surface, which is expensive and has significant weight. The support tools typically include an egg-crate style metal structure having multiple components fit together and interlocking, which require custom machining operations to match the contour of the upper plate. The structures need to be assembled to support the upper plate, which can be time consuming and difficult to achieve. The resulting support tool is rather heavy and costly to manufacture.

Some small scale manufacturing processes employ additive manufactured parts. However, with large scale support tooling, the support tooling surface is too large for additive manufactured support tools to be practical. For example, the support tool itself may be unable to withstand certain forces, such as forces induced during transporting or moving of the support tool, without cracking under its own weight. Additionally, the support tool may be unable to maintain dimensional stability because the material of the support tool lacks required rigidity. For example, certain applications may require the support tool to maintain dimensional stability for the manufacturing process to be effective. One particular application is a trimming support tool that requires precise trimming of the composite part, such as for use as an aircraft wing. If the support tool is warped or damaged such that the supporting surface for the part is deflected more than an allowable tolerance, then the support tool can no longer be used for trimming the parts and a new support tool will need to be manufactured.

SUMMARY

In accordance with one embodiment, a tool assembly includes a support frame including support beams and support mounts. The support mounts support the support beams. The support frame is rigid and used to transport the tool assembly. A support tool is supported by the support frame. The support tool has a faceplate and a supporting grid structure formed with the faceplate as a monolithic structure. The faceplate and the supporting grid structure are defined by a series of additive manufactured (AM) layers built on each other with the supporting grid structure being positioned below and supporting the faceplate. The faceplate has a supporting surface at a top of the support tool for supporting a working component. The supporting surface is contoured and defined by a well formed into the top-most AM layers. The supporting grid structure engages the support beams such that loads are transferred between the support tool and the support frame through the support beams. The support frame maintains dimensional stability of the support tool during transport and when resting within an allowable tolerance of the support tool.

In accordance with another embodiment, a tool assembly is provided including a support frame including support beams, cross beams and support mounts. The support mounts support the support beams. The cross beams extend between the support beams. The support frame is rigid and used to transport the tool assembly. The support mounts each having a hoist ring for hoisting the support frame during transport. The cross beams have fork lift sleeves for receiving forks of a fork lift for lifting the support frame during transport. Lifting forces induced to the support frame through the hoist rings or through the fork lift sleeves are transferred to the support beams. A support tool is supported by the support frame. The support tool has a faceplate and a supporting grid structure formed with the faceplate as a monolithic structure. The faceplate has a supporting surface at a top of the support tool for supporting a working component. The supporting grid structure engages the support beams such that loads are transferred between the support tool and the support frame through the support beams. The lifting forces are transferred from the support beams to the support grid structure and are spread through the support tool by the support grid structure.

In accordance with a further embodiment, a tool assembly is provided including a metal support frame including support beams, cross beams and support mounts. The cross beams connect between and fix the support beams in position relative to each other. Each support beam extends between a first end and a second end. The support mounts are provided at and support the support beams at the first and second ends. Each support beam includes a plurality of attachment points along a top thereof. The support frame is rigid and used to transport the tool assembly. A support tool is removably coupled to the support frame. The support tool is supported by the support frame. The support tool has a faceplate and a supporting grid structure formed with the faceplate as a monolithic structure. The faceplate has a supporting surface at a top of the support tool for supporting a working component. The supporting grid structure engages the support beams at the attachment points such that loads are transferred between the support tool and the support frame through the support beams. The support tool is removable from the metal support frame such that a different support tool having a different faceplate for supporting a different working component are configured to be assembled to and supported by the support frame. The support frame defines a common supporting structure for the different support tools.

In accordance with another embodiment, a method of transporting a tool assembly is provided using a support tool having a faceplate and a supporting grid structure formed with the faceplate as a monolithic structure defined by a series of additive manufactured (AM) layers built on each other with the supporting grid structure being positioned below and supporting the faceplate that includes a supporting surface at a top of the support tool for supporting a working component being contoured and defined by a well formed into the top-most AM layers. The method includes attaching the support tool to a support frame including support beams and support mounts supporting the support beams by coupling the supporting grid structure to the support beams, and lifting the support frame and moving the support frame to move the more fragile support tool. The method includes using the support frame to maintain dimensional stability of the support tool during transport within an allowable tolerance of the support tool.

In accordance with a further embodiment, a method of manufacturing a tool assembly used for processing a working component includes building a support tool on a build surface by an additive manufacturing process, wherein the support tool is built upside-down with a faceplate of the support tool on the build surface. The support tool is built to include a supporting grid structure for the faceplate as a monolithic structure with the faceplate. The method includes attaching the supporting grid structure to support beams of a support frame including support mounts supporting the support beams, such that the support frame rigidly holds the support tool, and the faceplate of the support tool by removing portions of the faceplate to form a supporting surface for supporting the working component for processing on the supporting surface.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 9 is a bottom view of the support tool in accordance with an exemplary embodiment.

FIG. 10 is a bottom perspective view of the support tool.

FIG. 11 is a bottom perspective view of the support tool.

FIG. 12 is a bottom perspective view of a portion of the support tool.

DETAILED DESCRIPTION

Figure 1:
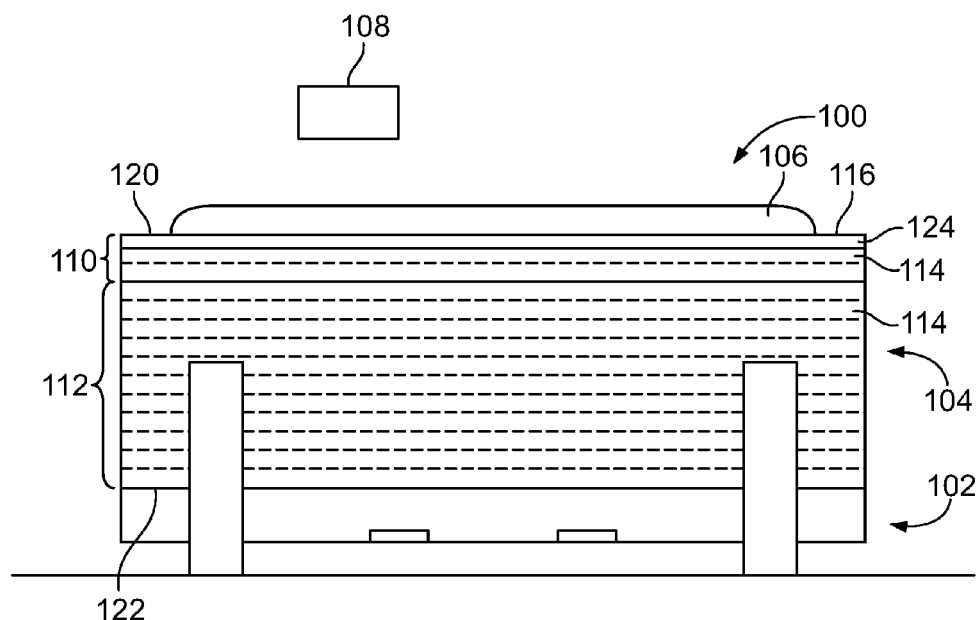
FIG. 1 is a schematic illustration of a tool assembly formed in accordance with an exemplary embodiment.

The embodiments described herein provide an additively manufactured support tool having sufficient strength and rigidity to maintain dimensional stability within an allowable tolerance of the support tool. The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 is a schematic illustration of a tool assembly 100 formed in accordance with an exemplary embodiment. The tool assembly 100 includes a support frame 102 and a support tool 104 supported by the support frame 102. The support tool 104 is used to support a working component 106 for processing the working component 106 during a manufacturing process of the working component 106. The support frame 102 is rigid and is used to transport the tool assembly 100. For example, the support frame 102 may be lifted and moved to move the more fragile support tool 104. The support frame 102 is used to maintain dimensional stability of the support tool 104 during transport within an allowable tolerance of the support tool 104.

The support tool 104 may be customized to properly support the working component 106. For example, the support tool 104 may have a complementary profile as the working component 106 for supporting the working component 106. The support tool 104 may be contoured to receive and support the working component 106. Different support tools 104 may be provided for processing different components 106. Optionally, the support tools 104 may be interchanged with the support frame 102 to process different components 106.0

In an exemplary embodiment, the working component 106 may be a large component and the support tool 104 may have a large surface area to accommodate the large working component 106. For example, the working component 106 may be an aircraft component, such as an exterior component of an aircraft. The working component 106 may be a portion of the skin of the aircraft. The working component 106 may be part of the fuselage of the aircraft. The working component 106 may be part of a wing of the aircraft, such as the leading edge of the wing, the flap of the wing, and the like. The working component 106 may be an interior component of the aircraft. The working component 106 may be a non-aircraft component in other various embodiments, such as a component for another type of vehicle, such as an automobile, a boat, and the like. The working component 106 may be a non-vehicle component in other various embodiments, such as an industrial component. Optionally, the working component is a composite part. Alternatively, the working component 106 may be a metal part.

The support tool 104 is used to support the working component 106 during a manufacturing process. For example, the support tool 104 may be used during a trimming process of the working component 106. After the working component 106 is formed, excess material may be removed from the working component 106 to define a precise, repeatable shape for the working component 106. The support tool 104 fixes the position of the working component 106 during processing, such as trimming. The support tool 104 may be used to aide the processing of the working component 106. For example, the support tool 104 may include locating features for a support tool 108 to process the working component 106. The support tool 104 may include a router groove for guiding the support tool 108 during the trimming process. The support tool 104 may include other features for other types of support tools to use during other processes. For example, the support tool 104 may be used during a pressing and forming process for the working component 106. In such embodiments, the support tool 104 may include a mandrel or other surface that holds the working component 106. The support tool 108 may press the working component 106 during the pressing and forming process to shape the working component 106. The support tool 104 may be used in other processes in alternative embodiments, and is not limited to the trimming process described in further detail below.

In an exemplary embodiment, the support tool 104 includes a faceplate 110 and a supporting grid structure 112 formed with the faceplate 110 is a monolithic structure. The faceplate 110 and the supporting grid structure 112 are defined by a series of additive manufactured (AM) layers 114 built on each other to form the support tool 104. Any number of AM layers 114 may be provided to form the support tool 104. For example, the support tool 104 may include 20 or more layers 114, such as 40 or more layers. The faceplate 110 defines a supporting surface 116 for supporting the working component 106. The support tool 104 extends between a top 120 and a bottom 122. The bottom 122 rests on the support frame 102. The top 120 is used to support the working component 106. In an exemplary embodiment, the faceplate 110 is provided at the top 120 while the supporting grid structure 112 is provided at the bottom 122.

In an exemplary embodiment, the AM layers 114 are manufactured from a thermoplastic polymer material, thermoset polymer material, or another polymer material. For example, the AM layers 114 may be manufactured from an Acrylonitrile-Butadiene-Styrene (ABS) material, such as a carbon filled ABS material. The AM layers 114 are applied or built-up using an additive manufacturing process, such as fused filament fabrication (FFF), plastic jet printing (PJP), 3-D printing, powder bed processing, selective heat sintering (SHS), and the like. Additive manufacturing the support tool 104 may significantly reduce the fabrication cost and lead-time for fabrication as compared to metal plate type support tools. Additionally, the additive manufactured support tool 104 is significantly lighter weight than metal plate type support tools.

The shape and topology of the AM layers 114 may be designed or optimized based on supporting loads of the working component 106 at the surface and supporting loads of the support tool 104 on the support frame 102. Many design constraints may be considered, such as weight and material costs, workability for forming the supporting surface for the working component 106, size of the structure, strength, rigidity, deflection, and the like. While the support tool 104 may be manufactured from a material that is lighter weight, easier to manufacture and easier to work with as compared to a metal material, consideration must be given to how the material is handled. For example, the material may be fragile and susceptible to damage, such as from cracking or warping, particularly when the support tool 104 has a large area (for example, length and width compared to depth). For example, depending on the size of the support tool 104 (for example, relatively thin compared to length and width), the support tool 104 may crack under its own weight during transportation.

The support frame 102 is used to provide rigidity and support to the support tool 104, such as during transportation, to prevent damage to the support tool 104. The support frame 102 may be manufactured from a high-strength material, such as a steel material, that provides a rigid support for the support tool 104. During transportation of the tool assembly 100, the support frame 102 may be lifted rather than lifting directly at the support tool 104. The lifting forces on the support frame 102 may be transferred to the support tool 104 in a way that the forces are dissipated through the support tool 104 in a manner that the support tool 104 is not damaged during transportation. For example, the support tool 104 may be thickened in the areas where the support tool 104 engages the support frame 102. The support tool 104 may have arches at the attachment points with the support frame 102 to efficiently transfer the load between the support frame 102 and the support tool 104.

In an exemplary embodiment, the support tool 104 should be designed to maintain dimensional stability. For example, the support tool 104 should maintain dimensions at the supporting surface for the working component 106 within an allowable tolerance of the support tool 104. As such, the dimensions of the finished working component 106 after processing may be maintained from part to part throughout the life of the support tool 104. In an exemplary embodiment, the tool assembly 100 may maintain a dimensional stability within approximately 0.25 mm of a designed dimension of the supporting surface 116 during the life of the support tool 104. In some embodiments, the tool assembly 100 may maintain a dimensional stability of approximately 0.1 mm of a designed dimension of the supporting surface 116 during the life of the support tool 104, which for support tools 104 having a depth of approximately 30 cm or more is an extremely small amount of deflection.

In other embodiments, such small tolerances may not be needed, depending on the working component 106 being processed. The support frame 102 maintains dimensional stability of the support tool 104 during transport and when resting within the allowable tolerance of the support tool 104. For example, because the support frame 102 is rigid and the support tool 104 is connected to the support frame 102, the support frame 102 maintains dimensional stability for the support tool 104. The support tool 104 may be unable to maintain its own dimensional stability when subjected to high forces, such as the forces from lifting the tool assembly 100. However, with the addition of the support frame 102, the lifting forces are overcome due to the strength and rigidity provided by the support frame 102. The allowable tolerance of the support tool 104 may be based on the material of the support tool 104, the shape of the support tool, the thickness or height of the support tool 104, the surface area of the support tool 104, the weight of the support tool, the arrangement of the grid walls of the supporting grid structure, the thickness of the faceplate, the location of the connecting points to the support frame 102, and the like.

Optionally, the faceplate 110 may include a seal layer 124 at the top 122. The seal layer 124 may be configured to maintain a vacuum pressure at the supporting surface 116. As such, when the tool assembly 100 includes a vacuum system for creating a vacuum pressure at the supporting surface 116, the seal layer 124 may be used to maintain the vacuum pressure to secure the working component 106 to the supporting surface 116. The seal layer 124 may be manufactured from a different material from the AM layers 114, such as a material having fewer voids than the AM layers 114. The seal layer 124 may be applied to the supporting surface 116 after the supporting surface 116 is contoured. The seal layer 124 may include polymer resins. The seal layer 124 may include a reinforcing mat, such as a fiberglass mat. The seal layer 124 may be a mixture of talc and plastic. Other types of seal layers 124 may be provided in alternative embodiments. In an exemplary embodiment, the seal layer 124 is non-hydroscopic to prevent water or other liquids from warping or damaging the faceplate 110.

Figure 2:
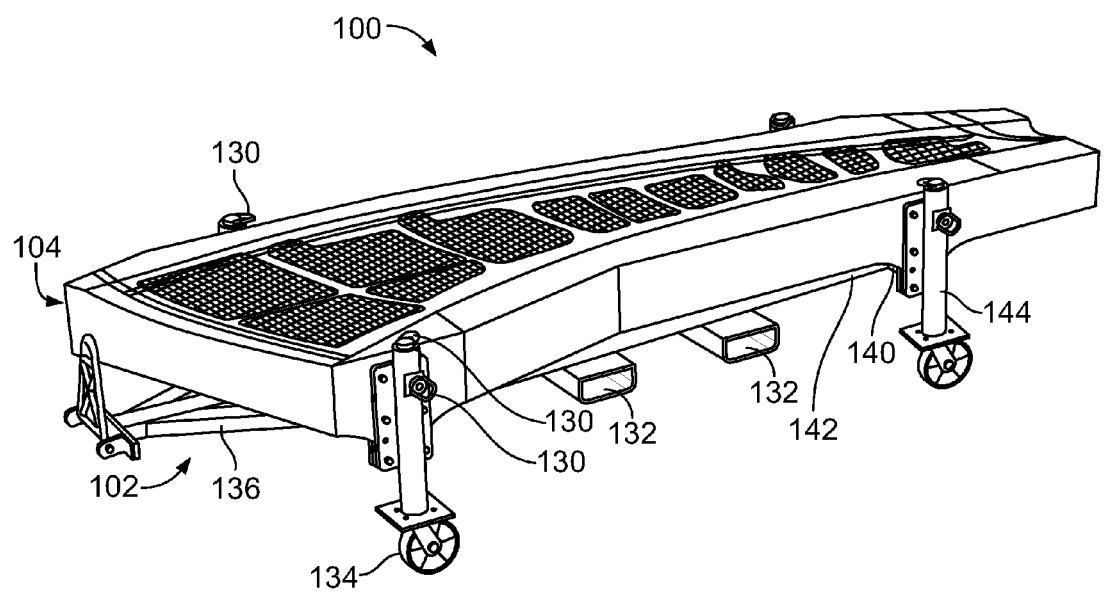
FIG. 2 is a perspective view of the tool assembly showing a support frame and support tool in accordance with an exemplary embodiment.

FIG. 2 is a perspective view of the tool assembly 100 in accordance with an exemplary embodiment. The tool assembly 100, in the illustrated embodiment, is used as a holding fixture for trimming a surface component of an aircraft, such as a wing flap; however, the tool assembly 100 may be used as a holding fixture for other types of working components 106 and/or for other manufacturing processes other than trimming. FIG. 2 shows the support tool 104 coupled to the support frame 102. The support frame 102 is illustrated including various features used for transporting the tool assembly 100; however, the support frame 102 may be provided with any or all of the transporting features or other types of transporting features, while still providing support for the support tool 104. The support tool 104 engages the support frame 102 such that loads are transferred between the support tool 104 and the support frame 102 to maintain dimensional stability of the support tool 104 during transport and when resting within an allowable tolerance of the support tool 104.

In an exemplary embodiment, the support frame 102 includes hoist rings 130 for hoisting the tool assembly 100, such as using a crane, lift, tractor or other machine. Any number of hoist rings 130 may be used. The hoist rings 130 may be adequately spaced apart to ensure that the tool assembly 100 may be lifted without damaging the support tool 104. In the illustrated embodiment, the tool assembly 100 includes four hoist points near the four spaced apart corners of the tool assembly 100. The hoist points may be positioned to balance the load of the tool assembly 100 during lifting, such as to retain the support tool 104 in a generally horizontal orientation. In the illustrated embodiment, the hoist rings 130 are provided near the top of the support frame 102 to lift the tool assembly 100 from above.

In an exemplary embodiment, the tool assembly 100 includes forklift sleeves 132 configured to receive forks, such as of a forklift, a crane or another machine to lift the support frame 102. The forklift sleeves 132 may be appropriately spaced apart from each other. The forklift sleeves 132 may be appropriately positioned, such as near the center of the tool assembly 100 to balance the weight of the tool assembly 100 on the forks of the machine. In the illustrated embodiment, the forklift sleeves 132 are provided near the bottom of the support frame 102 to lift the tool assembly 100 from below.

In an exemplary embodiment, the tool assembly 100 includes casters 134 for rolling the tool assembly 100 along the floor. Optionally, the tool assembly 100 includes one or more tow bars 136 part of the support frame 102 for towing the tool assembly 100. For example, tow bars 136 may be provided at both ends of the tool assembly 100. Optionally, the casters 134 may be removable such that the support frame 102 may be bolted to the floor rather than being movable along the floor.

The support frame 102 includes various metal beams or other structures, which may be coupled together to form the support frame 102. For example, in the illustrated embodiment, the support frame 102 includes support beams 140, cross beams 142 extending between the support beams 140, and support mounts 144 for supporting the support beams 140. Other beams or components may be included in alternative embodiments. The metal material of the support frame has a stiffness and strength greater than the support tool 104.

Figure 3:
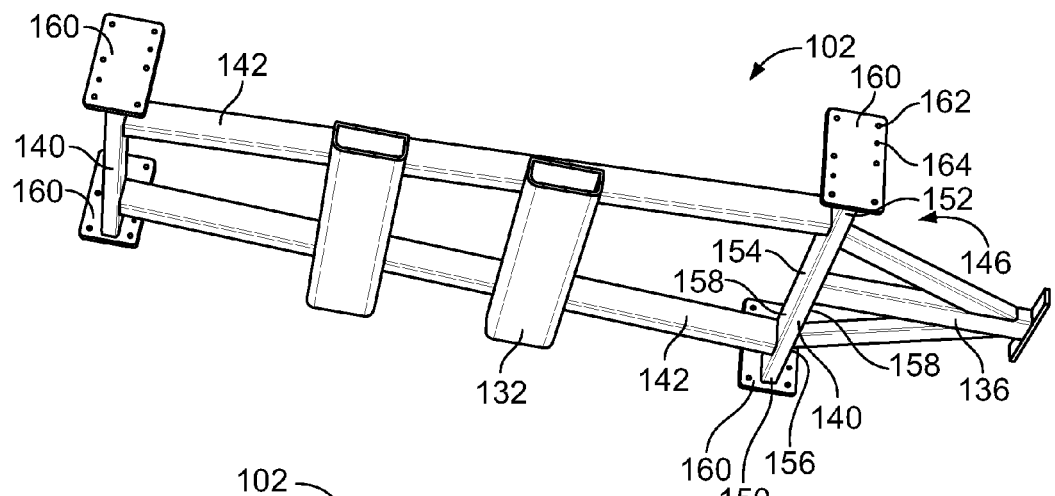
FIG. 3 is a bottom perspective view of a portion of the support frame showing support beams and cross beams.
Figure 4:
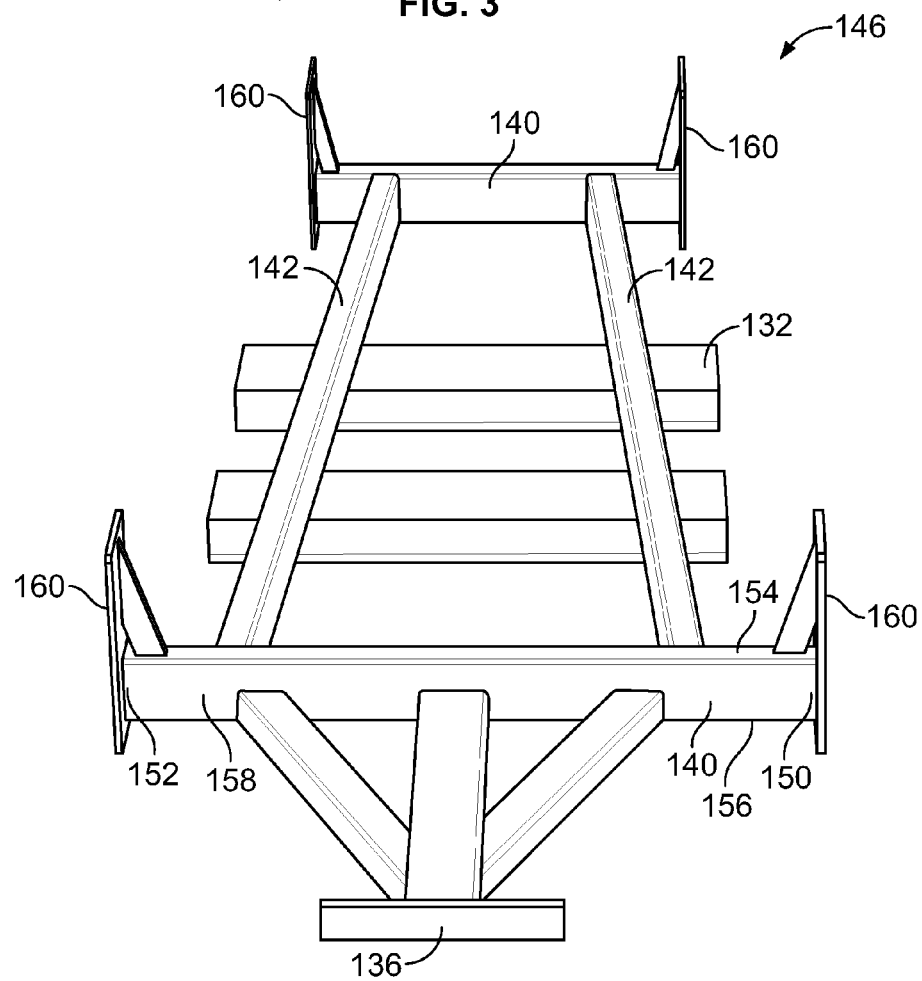
FIG. 4 is a front perspective view of a portion of the support frame.
Figure 5:
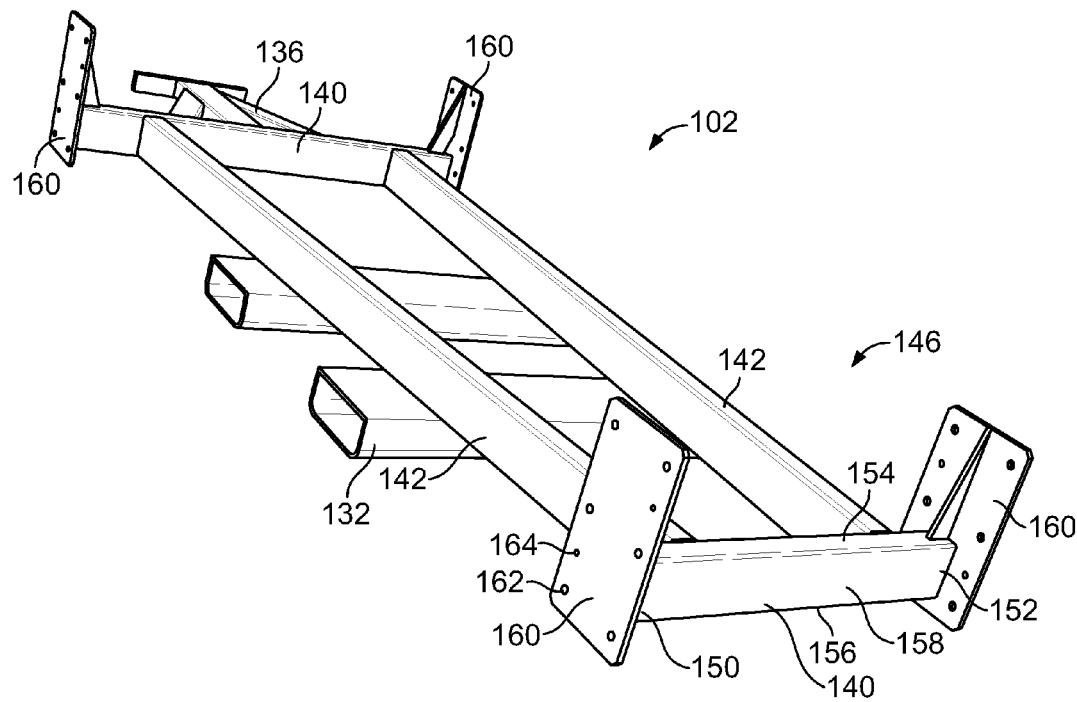
FIG. 5 is a rear perspective view of a portion of the support frame.

FIG. 3 is a bottom perspective view of a portion of the support frame 102 showing the support beams 140 and the cross beams 142. FIG. 4 is a front perspective view of a portion of the support frame 102 showing the support beams 140 and the cross beams 142. FIG. 5 is a rear perspective view of a portion of the support frame 102 showing the support beams 140 and the cross beams 142. The support beams 140 and the cross beams 142 form a base frame 146 of the support frame 102. The support mounts 144 (shown in FIG. 1) may be coupled to the base frame 146 to support the base frame 146. In other embodiments, the support mounts 144 may be integral or permanent parts of the base frame 146, such as of the support beams 140 and thus form part of the base frame 146.

The support beams 140 are used to support the support tool 104 (shown in FIG. 1). For example, the support tool 104 may directly engage the support beams 140. In the illustrated embodiment, two support beams 140 are provided, such as to support the front of the support tool 104 and the rear of the support tool 104. However, additional support beams 140 may be provided in alternative embodiments. Optionally, the support tool 104 may additionally or alternatively directly engage the cross beams 142. The cross beams 142 extend between and connect to the support beams 140 to form a rigid support frame 102. The support beams 140 and the cross beams 142 may be any type of metal beams, such as hollow structural tubing, solid metal bars, I beams, channel beams, structural tees, and the like. The cross beams 142 may be coupled to the support beams 140, such as by welding, bolting, clamping, or other attachment means.

In the illustrated embodiment, the forklift sleeves 132 are attached to the cross beams 142, such as approximately centered between the support beams 140. The forklift sleeves 132 may be provided below the cross beams 142. The forklift sleeves 132 may be welded to the cross beams 142; however, the forklift sleeves 132 may be attached by other means, such as bolting or clamping, in alternative embodiments. In the illustrated embodiment, the tow bar 136 is attached to the front support beam 140. The tow bar 136 may additionally or alternatively be attached to the rear support beam 140. The tow bar 136 may be welded to the support beam 140; however, the tow bar 136 may be attached by other means, such as bolting or clamping, in alternative embodiments.

Each support beam 140 extends between a first end 150 and a second end 152. The support beam 140 includes a top edge 154 and a bottom edge 156. The support beam 140 includes opposite sides 158 extending between the edges 154, 156 and the ends 150, 152. The cross beams 142 are attached to corresponding sides 158 of the support beams 140. The top edge 154 may define a plurality of attachment points for the support tool 104. For example, the support tool 104 may be attached to the support beams 140 at multiple attachment points along the top edge 154.

In an exemplary embodiment, the support beam 140 includes attachment plates 160 at the first and second ends 150, 152. The attachment plates 160 may be welded to the ends 150, 152. The attachment plates 160 are used to attach the support mounts 144 to the support beams 140. However, in alternative embodiments, the support mounts 144 may be directly attached to the support beams 140. In an exemplary embodiment, the attachment plates 160 are connected to the support tool 104, such as described in further detail below. The attachment plates 160 include bolt openings 162 configured to receive bolts used to connect the attachment plate 160 to the support mount 144 and/or to the support tool 104. Optionally, the attachment plates 160 include dowel openings 164 configured to receive corresponding dowels to connect the attachment plate 160 to the support mount 144, the support tool 104 and/or other components. The attachment plates 160 have a large surface area to include a plurality of the bolt openings 162 and/or dowel openings 164 to spread loads between the support mounts 144 and/or the support tool 104 with the attachment plate 160. Optionally, the attachment plates 160 may be reinforced against the support beams 140, which may enhance load transfer to the support beams 140.

Figure 6:
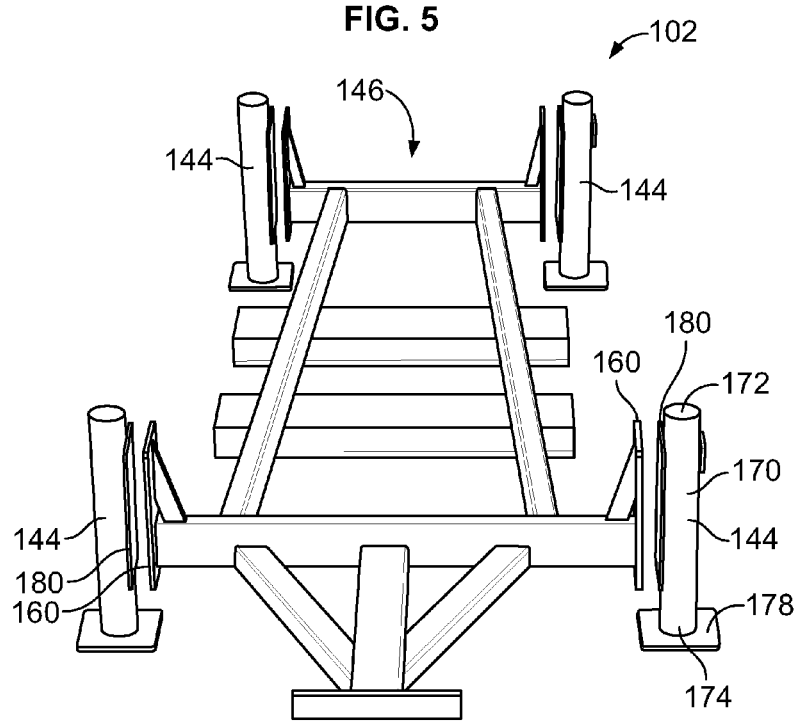
FIG. 6 is a front perspective view of the support frame showing a base frame and support mounts.
Figure 7:
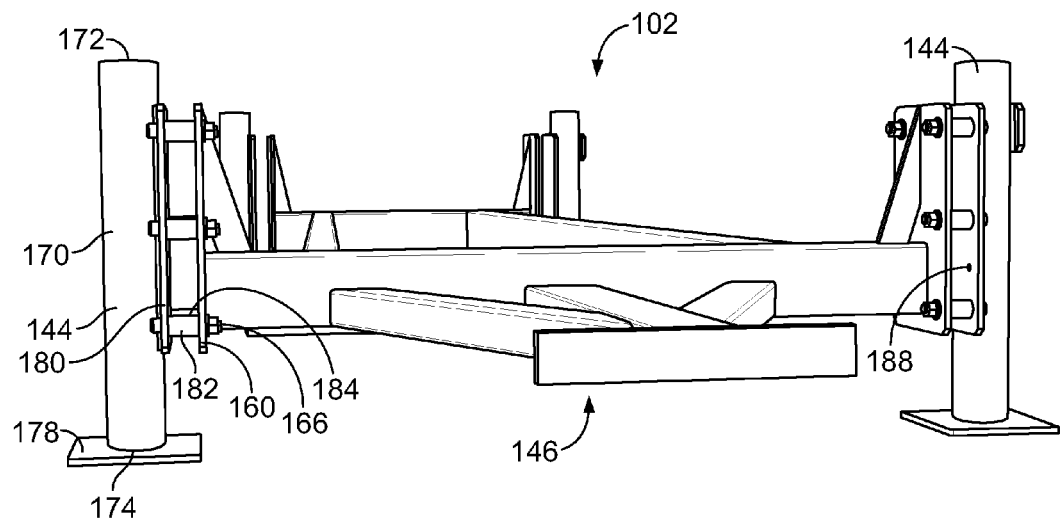
FIG. 7 is a front perspective view of the support frame showing the support mounts attached to the base frame.
Figure 8:
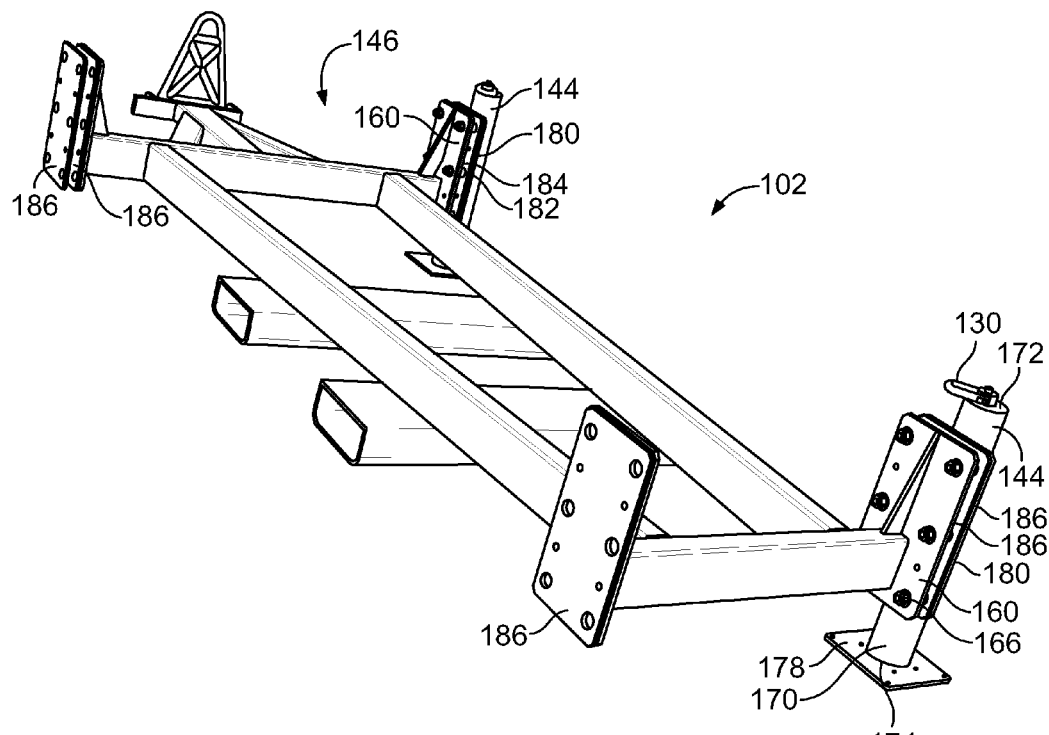
FIG. 8 is a rear perspective view of a portion of the support frame.

FIG. 6 is a front perspective view of the support frame 102 showing the base frame 146 and the support mounts 144. FIG. 7 is a front perspective view of the support frame 102 showing the base frame 146 and the support mounts 144 attached to the base frame 146. FIG. 8 is a rear perspective view of a portion of the support frame 102. In the illustrated embodiment, the support frame 102 includes four support mounts 144 generally supporting the four corners of the tool assembly 100. However, any number of support mounts 144 may be provided in alternative embodiments.

The support mounts 144 are used to support the base frame 146, which is in turn used to support the support tool 104 (shown in FIG. 1). In the illustrated embodiment, the support mounts 144 are discrete from the base frame 146 and attached thereto using bolts 166 configured to pass through the support tool 104. In an exemplary embodiment, each support mount 144 includes a post 170 extending between a top 172 and a bottom 174. In the illustrated embodiment, the post 170 has a circular cross-section; however, the post 170 may have other shapes in alternative embodiments, such as a rectangular shape. The hoist rings 130 (FIG. 8) may be attached to the posts 170 at or near the tops 172.

The support mount 144 includes a bolt down plate 178 at the bottom 174. The bolt down plate 178 may be welded to the post 170; however, the bolt down plate 178 may be attached to the post 170 by other means, such as bolting or clamping. In an exemplary embodiment, the casters 134 (shown in FIG. 1) may be connected to the bolt down plates 178, such as using bolts. However, the casters 134 may be removed such that the support mounts 144 may be attached directly to another structure, such as the floor. The bolt down plates 178 may be bolted directly to the floor to rigidly fix the support frame 102 to the floor.

The support mount 144 includes an attachment plate 180 connected to the post 170, such as at or near the top 172. The attachment plate 180 may be welded to the post 170. However, the attachment plate 180 may be attached to the post 170 by other means, such as bolting or clamping. The attachment plates 180 are connected to the attachment plates 160 of the base frame 146 using the bolts 166. In an exemplary embodiment, bushings 182 are positioned between the attachment plates 180, 160. The bushings 182 pass through the support tool 104. The bushings 182 include bearing surfaces 184 that directly engage the support tool 104. Lifting forces during transportation may be transferred from the bushings 182 to the support tool 104 through the bearing surfaces 184. In an exemplary embodiment, many bolts 166 and corresponding bushings 182 are provided to spread the lifting forces to the support tool 104 to reduce the risk of damage to the support tool 104.

In an exemplary embodiment, wear pads 186 (FIG. 8) are provided between the attachment plates 180, 160 and the support tool 104. For example, the wear pads 186 may abut directly against the attachment plates 180, 160 and the support tool 104 may be provided in the space between the wear pads 186. The bushings 182 and the bolts 166 pass through the wear pads 186. Optionally, the wear pads 186 may additionally include dowel openings 188 for receiving dowels connected to the attachment plates 180, 160. Optionally, the dowels may extend into the support tool 104. FIG. 8 illustrates the tool assembly 100 with some components removed to illustrate the attachment plates 160, 180 and wear pads 186. For example, in the view shown, both right side support mounts 144 are shown, but the left side support mounts are removed to illustrate the wear pads 186. Only one of the wear pads 186 are shown at the front end while both of the wear pads 186 are shown at the back end. In an exemplary embodiment, each mounting location would include two wear pads and associated attachment plates 160, 180.

Figure 13:
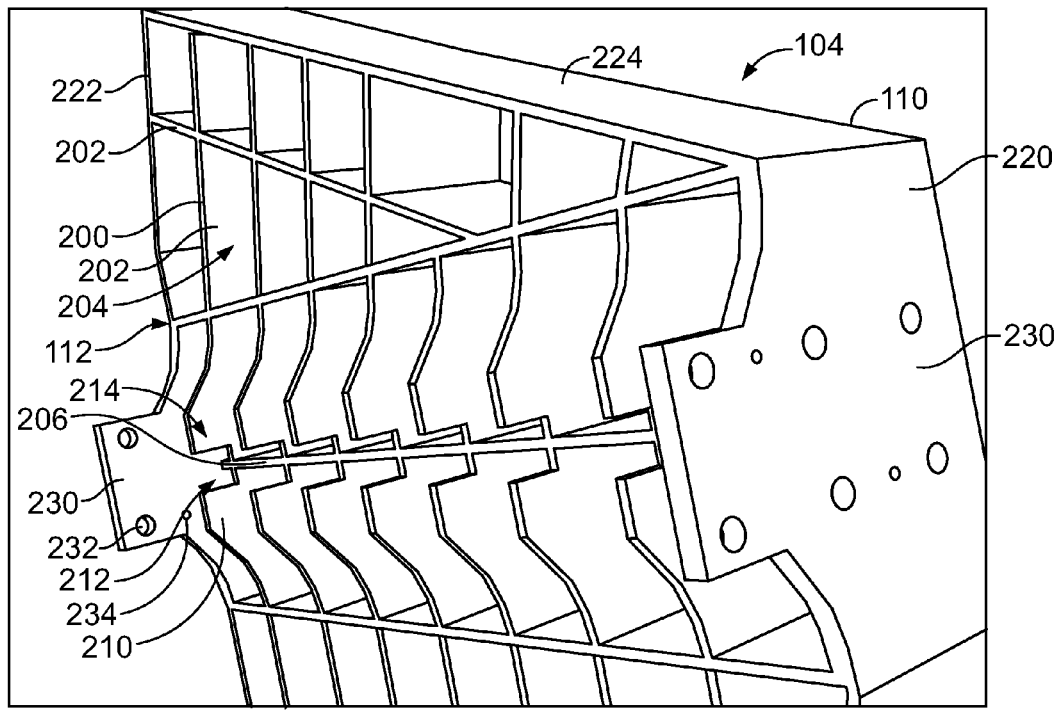
FIG. 13 is a bottom perspective view of a portion of the support tool.

FIG. 9 is a bottom view of the support tool 104 in accordance with an exemplary embodiment. FIG. 10 is a bottom perspective view of the support tool 104 in accordance with an exemplary embodiment. FIG. 11 is a bottom perspective view of the support tool 104. FIG. 12 is a bottom perspective view of a portion of the support tool 104. FIG. 13 is a bottom perspective view of a portion of the support tool 104.

The support tool 104 includes the faceplate 110 and the supporting grid structure 112 extending from a bottom 200 of the faceplate 110. The supporting grid structure 112 is formed with the faceplate 110 is a monolithic structure. The supporting grid structure 112 and the faceplate 110 are formed from the many AM layers built-up using an additive manufacturing process. In an exemplary embodiment, the bottom 200 of the faceplate 110 is contoured to complement the contoured shape of the supporting surface 116 at the top 120 of the faceplate 110. As such, the amount of material usage may be reduced, thus reducing the cost of the support tool 104 and the weight of the support tool 104.

The supporting grid structure 112 includes a plurality of grid walls 202 defining cavities 204 below the faceplate 110. In an exemplary embodiment, the grid walls 202 extends to bottom edges 206 defining a base plane 208 at the bottom 122 of the support tool 104. The support tool 104 may rest on the base frame 146 (shown in FIG. 3) at the base plane 208. For example, at least some of the bottom edges 206 may directly engage the base frame 146. Lifting forces may be transferred from the base frame 146 to the support tool 104 through the bottom edges 206 resting on the base frame 146. The forces may be spread through the supporting grid structure 112 to the faceplate 110. For example, the forces may be spread along the grid walls 202.

In an exemplary embodiment, at least some of the grid walls 202 include brace walls 210 extending therefrom below the base plane 208. The brace walls 210 are configured to engage the base frame 146 (for example, the support beams 140). Optionally, the brace walls 210 may be curved or arced to transfer loads and forces into the grid walls 202. In an exemplary embodiment, the brace walls 210 include pockets 212 that receive corresponding support beams 140. The brace walls 210 may extend along sides 158 of the support beams 140. Optionally, the bottom edges 206 of corresponding grid walls 202 may be exposed in the pockets 212 such that the bottom edges 206 may directly engage the support beam 140. The brace walls 210 define brackets 214 configured to engage the support beams 140 at multiple attachment points. The brackets 214 transfer loads or forces between the support tool 104 and the base frame 146.

The support tool 104 includes first and second side walls 220, 222 extending generally lengthwise along the support tool 104 and first and second end walls 224, 226 extending generally widthwise across the support tool 104. In the illustrated embodiment, the length of the support tool 104 is longer than the width of the support tool 104. Optionally, the side walls 220, 222 may be non-planar. For example, the support tool 104 may be wider at the first end wall 224 and narrower at the second end wall 226. Optionally, the end walls 224, 226 may be non-planar. For example, the first side wall 220 of the support tool 104 may be shorter than the second side wall 222. The side walls 220, 222 and/or the end walls 224, 226 may include multiple segments angled relative to each other. The dimensions of the side walls 220, 222 and the end walls 224, 226 may be selected to accommodate the shape of the working component 106 (shown in FIG. 1). For example, when working with a curved wing component of an aircraft, the component may taper from a root or base to a tip of the wing component. The faceplate 110 needs to be wider at the first end wall 224 to accommodate the wider portion of the wing component while the faceplate 110 is able to be narrower at the second end wall 226. Reducing the dimensions where allowed reduces the overall material and the overall weight of the support tool 104.

The grid walls 202 may be designed to accommodate the non-uniform shape of the support tool 104. For example, longitudinal grid walls 202a may extend generally lengthwise along the side walls 220, 222 between the end walls 224, 226, while lateral grid walls 202b may extend generally widthwise along the end walls 224, 226 between the side walls 220, 222. Some of the longitudinal grid walls 202a may be parallel to each other, while other longitudinal grid walls 202a may be nonparallel to each other. Some of the lateral grid walls 202b may be parallel to each other, while other lateral grid walls 202b may be nonparallel to each other. In the illustrated embodiment, the longitudinal grid walls 202a at the brace walls 210 are parallel to each other and are perpendicular to the lateral grid wall 202 that rests on the support beam 140. Optionally, some of the longitudinal grid walls 202a may have different thicknesses and some of the lateral grid walls 202b may have different thicknesses. Optionally, the side walls 220, 222 and/or the end walls 224, 226 may have similar thicknesses to the grid walls 202. Alternatively, the side walls 220, 222 and/or the end walls 224, 226 may be thicker than the grid walls 202.

In an exemplary embodiment, the support tool 104 includes mounting pads 230 for attaching to the support frame 102. For example, the mounting pads 230 may be connected to the attachment plates 160, 180. The mounting pads 230 are received in the space between the attachment plates 160, 180. The mounting pads 230 engage the support mounts 144 and/or the support beams 140 (such as through the wear pads 186) such that loads are transferred between the support tool 104 and the support frame 102 through the mounting pads 230. The mounting pads 230 may be compressed between the attachment plates 160, 180 such that the mounting pads 230 are secured between the attachment plates 160, 180 by a compression fit. The mounting pads 230 include bolt openings 232 for receiving the bolts 166 and the bushings 182. In an exemplary embodiment, the mounting pads 230 include dowel openings 234 for receiving dowels from the attachment plates 160 and/or 180.

In an exemplary embodiment, the mounting pads 230 are aligned with the brace walls 210 such that the mounting pads 230 are aligned with the support beams 140. The mounting pads 230 extend below the base plane 208 in the illustrated embodiment. The mounting pads 230 have increased height and thickness compared to other portions of the side walls 220, 222 to support the load transfer between the support tool 104 and the support frame 102. The mounting pads 230 are formed with the supporting grid structure 112 as part of the monolithic structure. The mounting pads 230 are built into the side walls 220, 222 as part of the AM layers during the additive manufacturing process.

Figure 14:
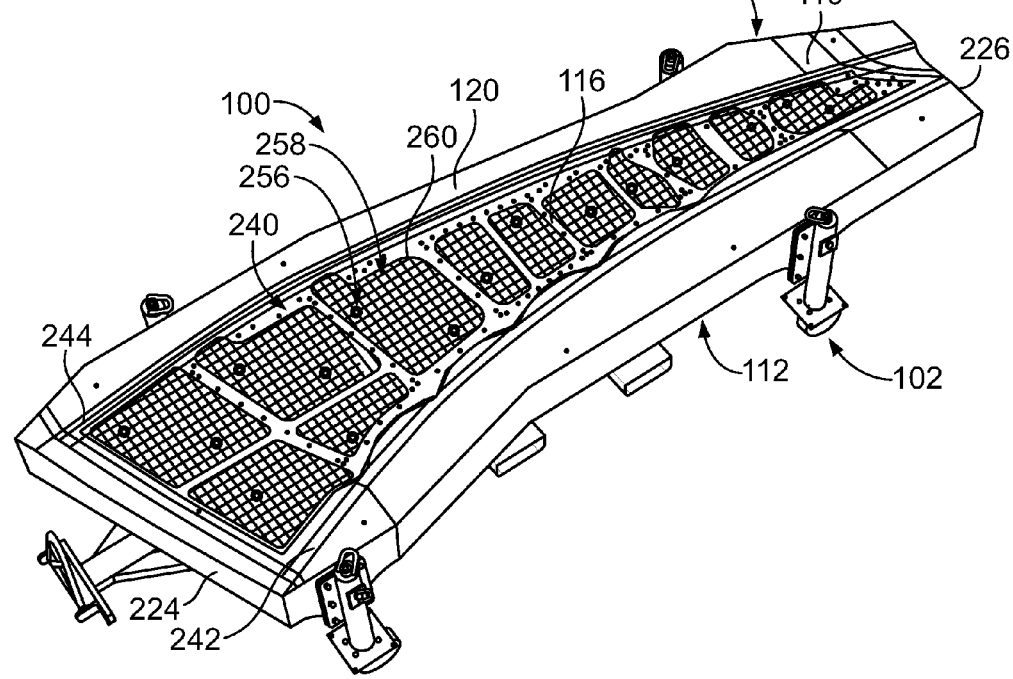
FIG. 14 is a top perspective view of the tool assembly showing a supporting surface of a faceplate of the support tool.
Figure 15:
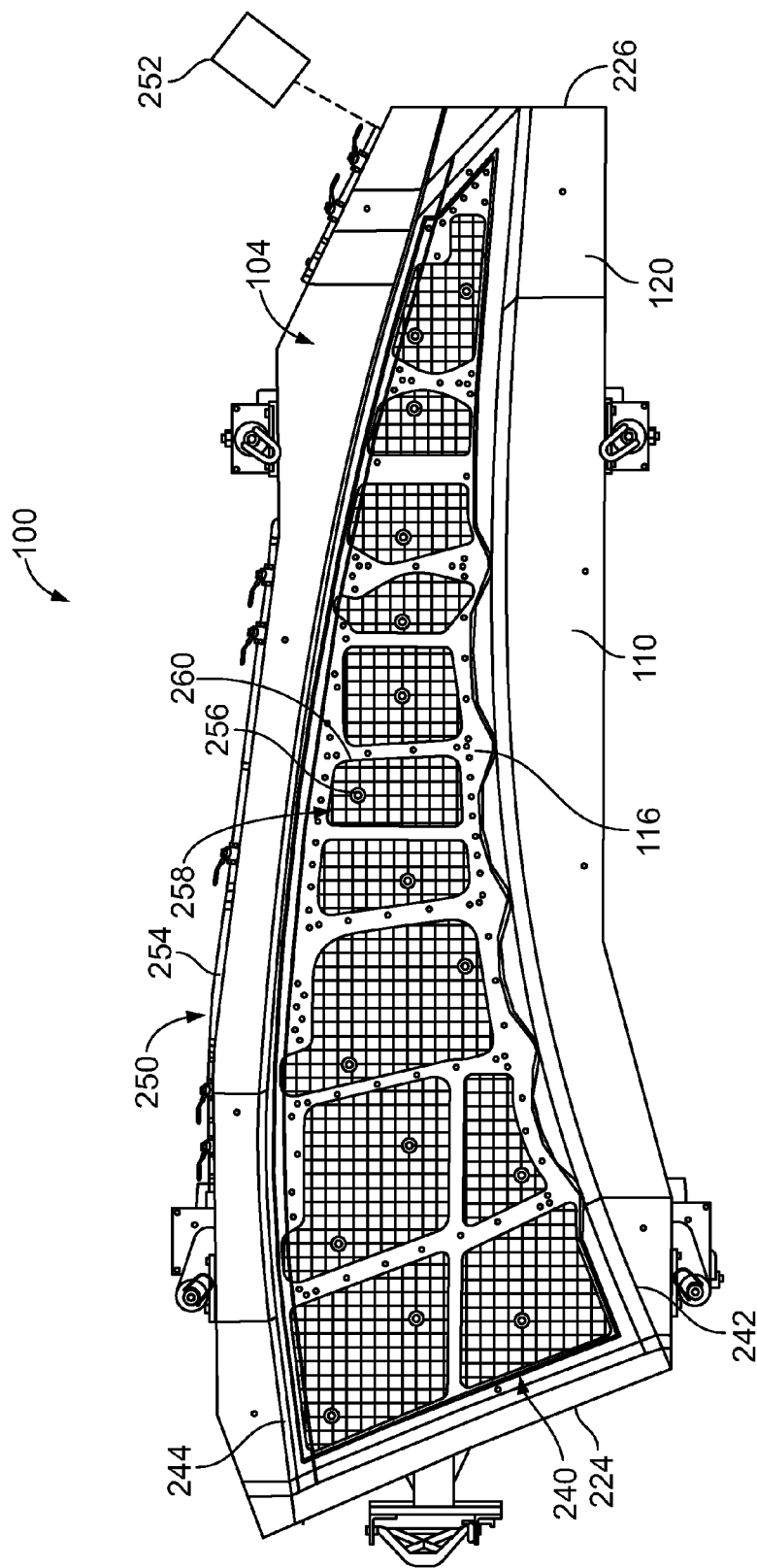
FIG. 15 is a top view of the tool assembly.

FIG. 14 is a top perspective view of the tool assembly 100 showing the supporting surface 116 of the faceplate 110 of the support tool 104. FIG. 15 is a top view of the tool assembly 100. The supporting surface 116 is sized and shaped to accommodate the working component 106 (shown in FIG. 1). The support tool 104 is a large area support tool for working with large working components 106. To reduce the weight of the support tool 104, the support tool 104 may be relatively thin (for example, small height) as compared to a length and a width of the support tool 104. For example, the support tool 104 may have a width of at least 60.0 cm and a length of at least 150.0 cm, while having a depth of at least 20.0 cm. In various embodiments, the support tool 104 may have a width of approximately 150.0 cm and a length of approximately 450.0 cm, while having a depth of approximately 30.0 cm; however, the support tool 104 may have any appropriate dimensions to accommodate the working component 106.

The large surface area along with the relatively thin depth makes the support tool fragile and susceptible to damage, such as from cracking or warping. Cracking or warping causes the supporting surface to become dimensionally unstable, such as by shifting one or more portions of the supporting surface out of manufacturing tolerance. If the support tool is dimensionally unstable, it is unsuitable for manufacturing the working component. For example, the trimming operation would lead to improperly shaped aircraft wing components, which would be unusable for building the aircraft. In some embodiments, the allowable tolerance for maintaining dimensional stability is extremely small. For example, in various embodiments, a dimensional stability of within approximately 0.25 mm of a designed dimension of the supporting surface 116 is to be maintained during the life of the support tool 104. In some embodiments, the tool assembly 100 is to maintain a dimensional stability of approximately 0.1 mm of a designed dimension of the supporting surface 116 during the life of the support tool 104, which for support tools 104 having a depth of approximately 30 cm or more is an extremely small amount of deflection. The support frame 102 maintains the dimensional stability of the more fragile support tool 104 by rigidly holding the support tool 104.

In the illustrated embodiment, the supporting surface 116 is nonplanar. For example, the supporting surface 116 includes a well 240 in the top 120 that receives the working component 106. The supporting surface 116 is curved to accommodate the curved surface of the aircraft wing component. In the illustrated embodiment, the well 240 is wider at the first end wall 224 of the support tool 104 and is narrower at the second end wall 226 of the support tool 104. Additionally, in the illustrated embodiment, the well 240 is curved between the front and rear ends. For example, a first side 242 of the well 240 may be curved and/or a second side 244 of the well 240 may be curved. Optionally, the well 240 may be open at the front and rear ends of the support tool 104. As such, fluid may be allowed to flow out of the well 240 during the manufacturing process.

In an exemplary embodiment, the tool assembly 100 includes a vacuum assembly 250 (FIG. 15). The vacuum assembly 250 maintains a vacuum pressure at the supporting surface 116 to hold the working component 106 on the supporting surface 116. The vacuum assembly 250 includes a vacuum generator 252 and a plurality of vacuum lines 254 extending to the supporting surface 116. In an exemplary embodiment, the vacuum lines 254 extend below the support tool 104, through the supporting grid structure 112 to the faceplate 110. The faceplate 110 includes a plurality of ports 256 extending therethrough. The vacuum lines 254 extend into or to the ports 256 to maintain a vacuum pressure at the supporting surface 116. In an exemplary embodiment, the support tool 104 includes a plurality of discrete vacuum areas 258 along the supporting surface 116. Each vacuum area 258 includes at least one port 256 connected to corresponding vacuum line 254. Seals 260 surround each vacuum area 258. The seals 260 may seal to the working component 106 to create a vacuum within the corresponding vacuum area 258.

Figure 16:
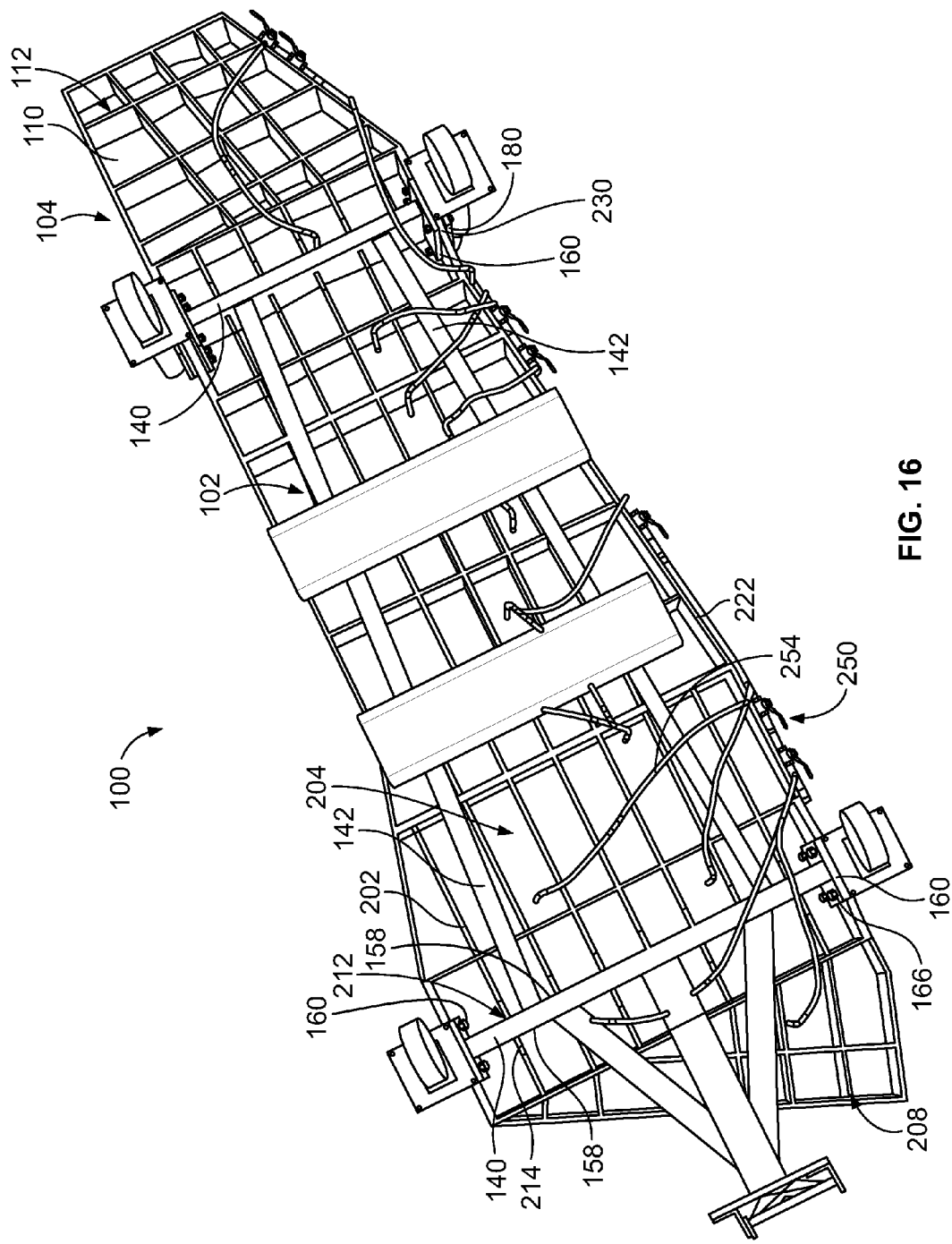
FIG. 16 is a bottom view of the tool assembly.
Figure 17:
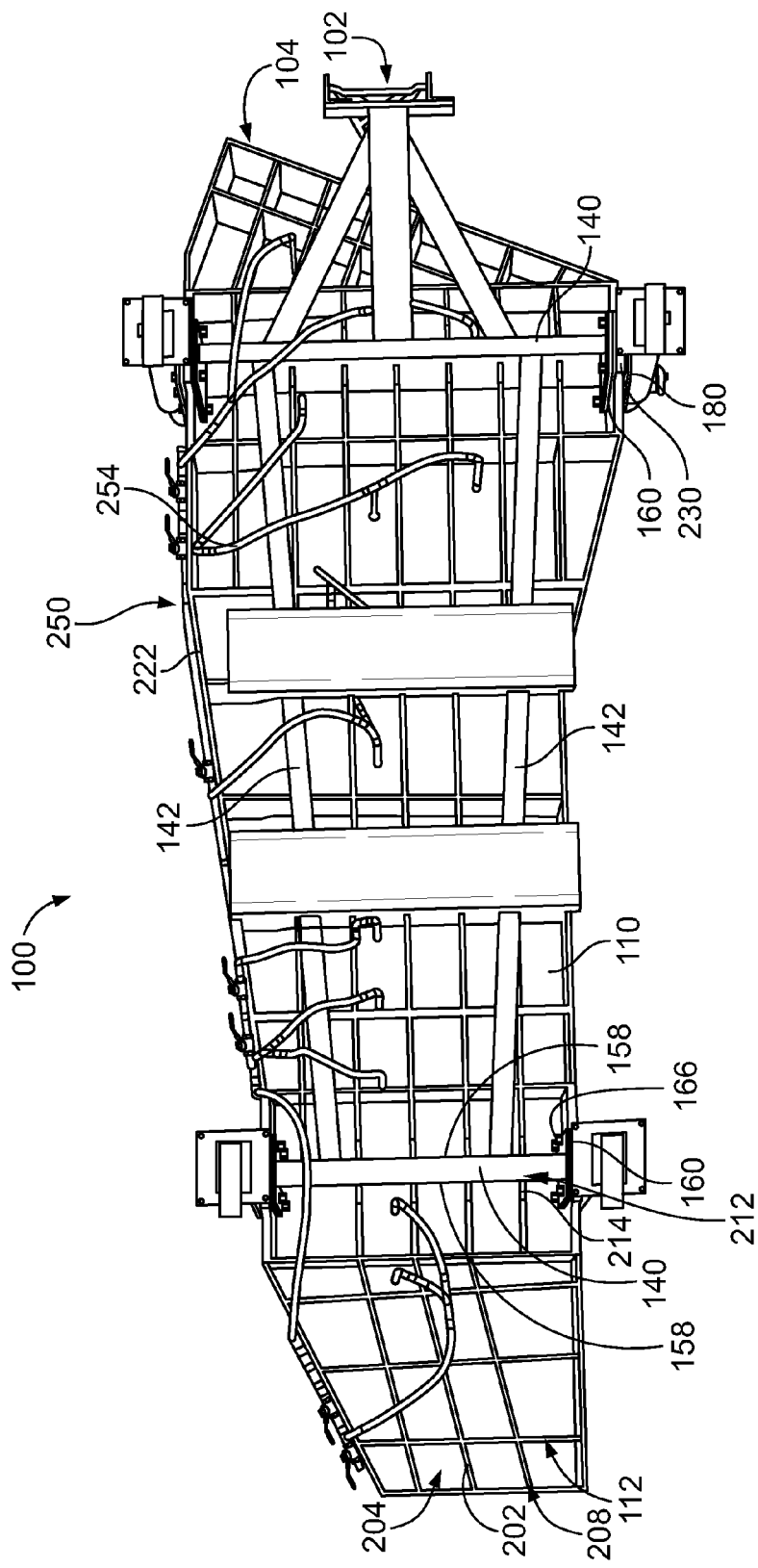
FIG. 17 is another bottom view of the tool assembly.
Figure 18:
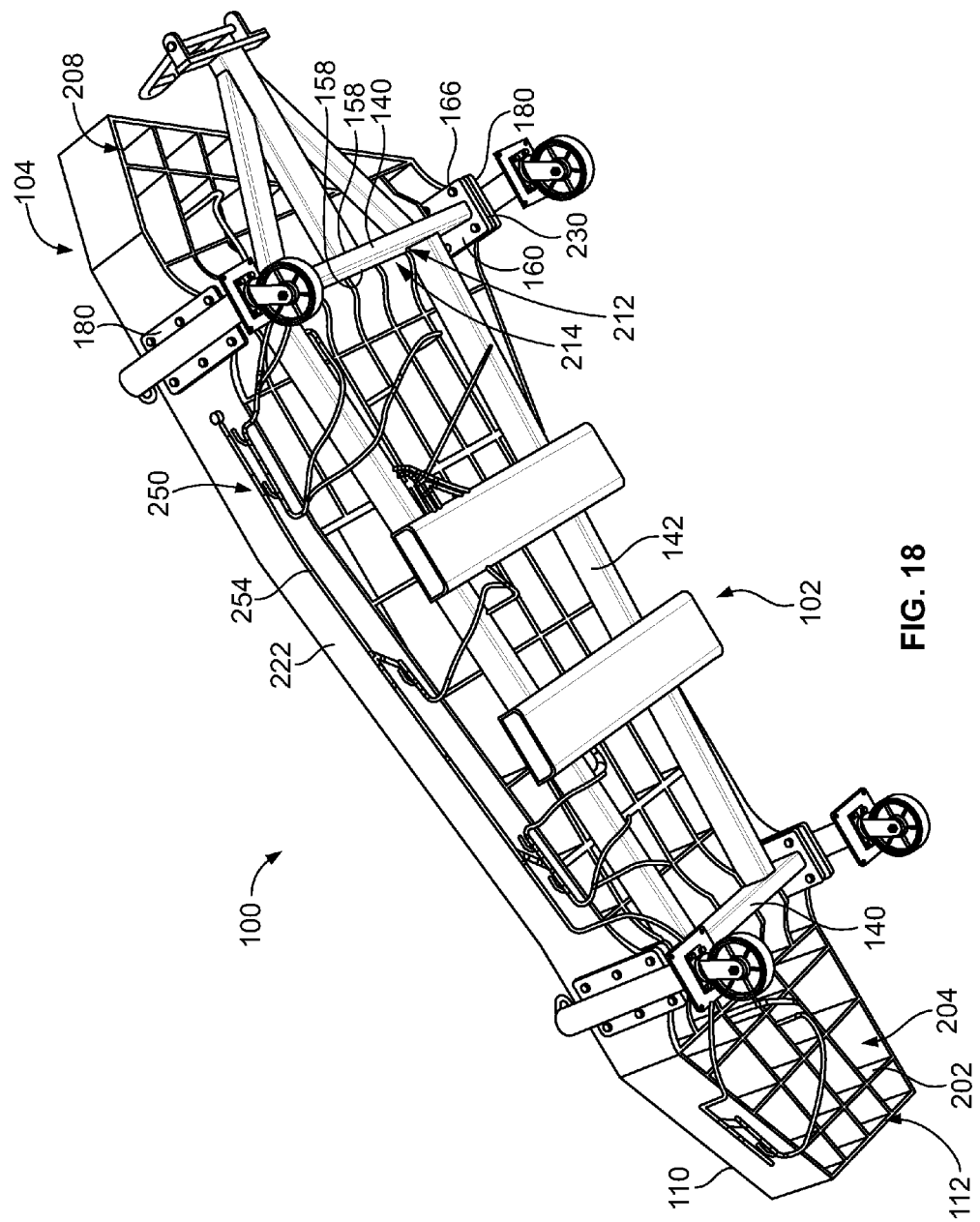
FIG. 18 is a bottom perspective view of the tool assembly.
Figure 19:
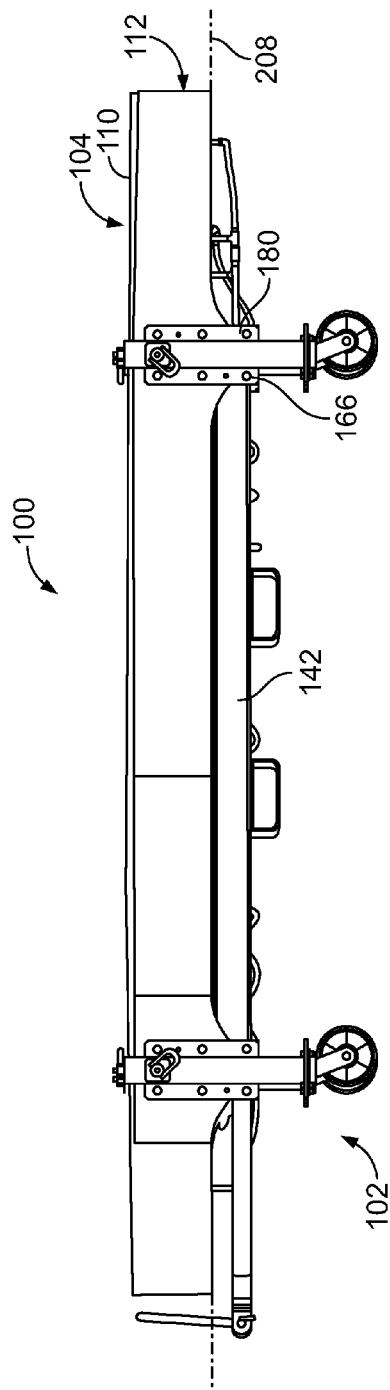
FIG. 19 is a side view of the tool assembly.
Figure 20:
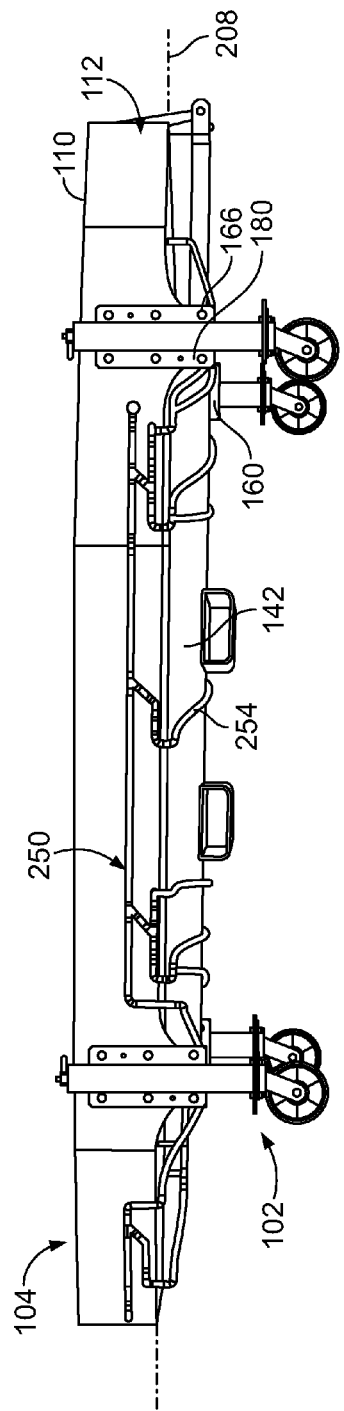
FIG. 20 is another side view of the tool assembly.

FIG. 16 is a bottom view of the tool assembly 100 in accordance with an exemplary embodiment. FIG. 17 is another bottom view of the tool assembly 100. FIG. 18 is a bottom perspective view of the tool assembly 100. FIG. 19 is a side view of the tool assembly 100. FIG. 20 is another side view of the tool assembly 100. The vacuum assembly 250 is illustrated in FIGS. 18 and 20 extending along the second side wall 222. The vacuum lines 254 may be routed below the support tool 104, such as into the cavities 204 for connection to the faceplate 110.

The support tool 104 is shown coupled to the support frame 102. When assembled, the support tool 104 rests on the support beams 140. For example, the brackets 214 engage the support beams 140 at attachment points 270 along the top edge 154 and sides 158 of the support beams 140. The support beams 140 are received in the pockets 212. Loads or forces are transferred between the support beams 140 and the supporting grid structure 112 through the grid walls 202. Optionally, the cross beams 142 may be located slightly below the base plane 208 such that the cross beams 142 do not interfere with the supporting grid structure 112. The cross beams 142 do not receive direct loads from the supporting grid structure 112, but rather rigidly support and hold the support beams 140.

In an exemplary embodiment, the support tool 104 is connected to the support frame 102 using the bolts 166. For example, the attachment plates 160 are connected to the interior surfaces of the mounting pads 230 and the attachment plates 180 are connected to exterior surfaces of the mounting pads 230. The bolts 166 extend entirely through the structure to connect the attachment plates 160, 180.

Figure 21:
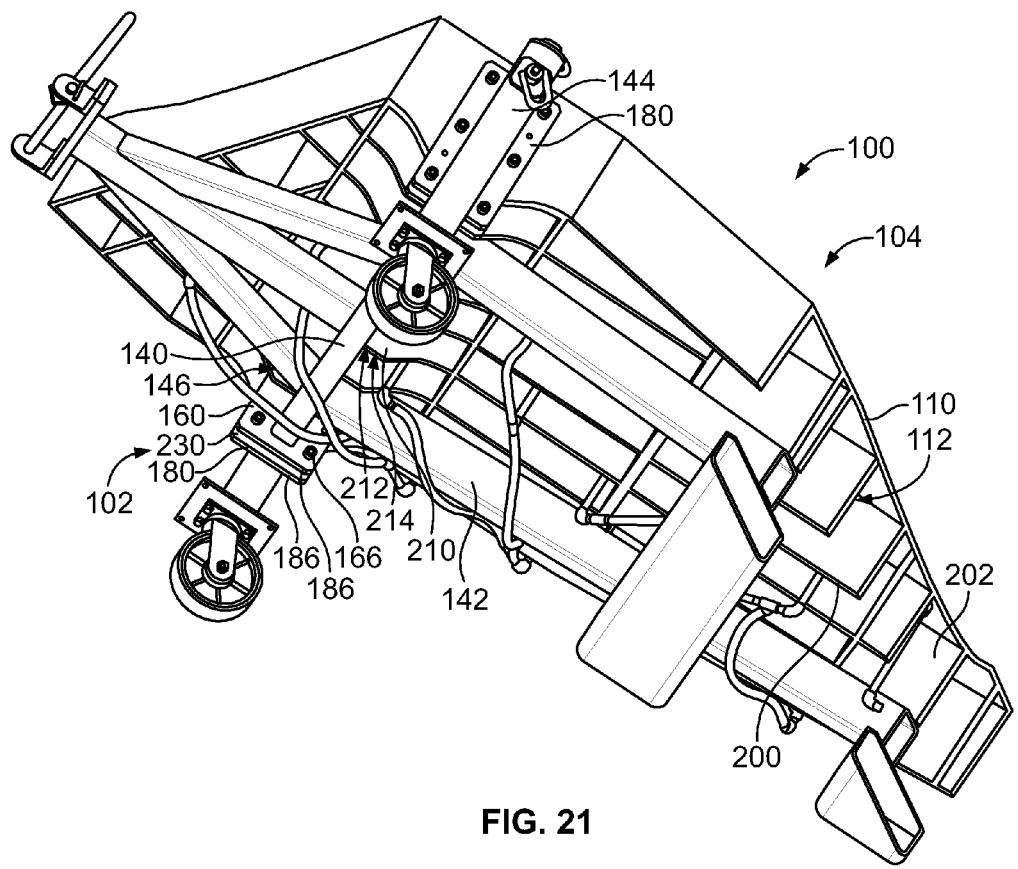
FIG. 21 is a sectional view of a portion of the tool assembly.
Figure 22:
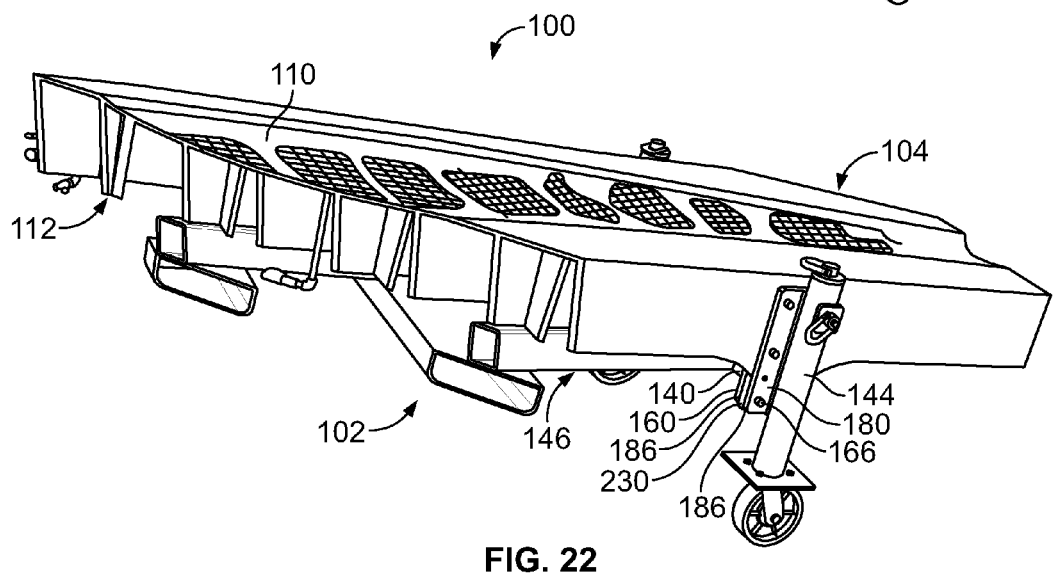
FIG. 22 is another sectional view of a portion of the tool assembly.
Figure 23:
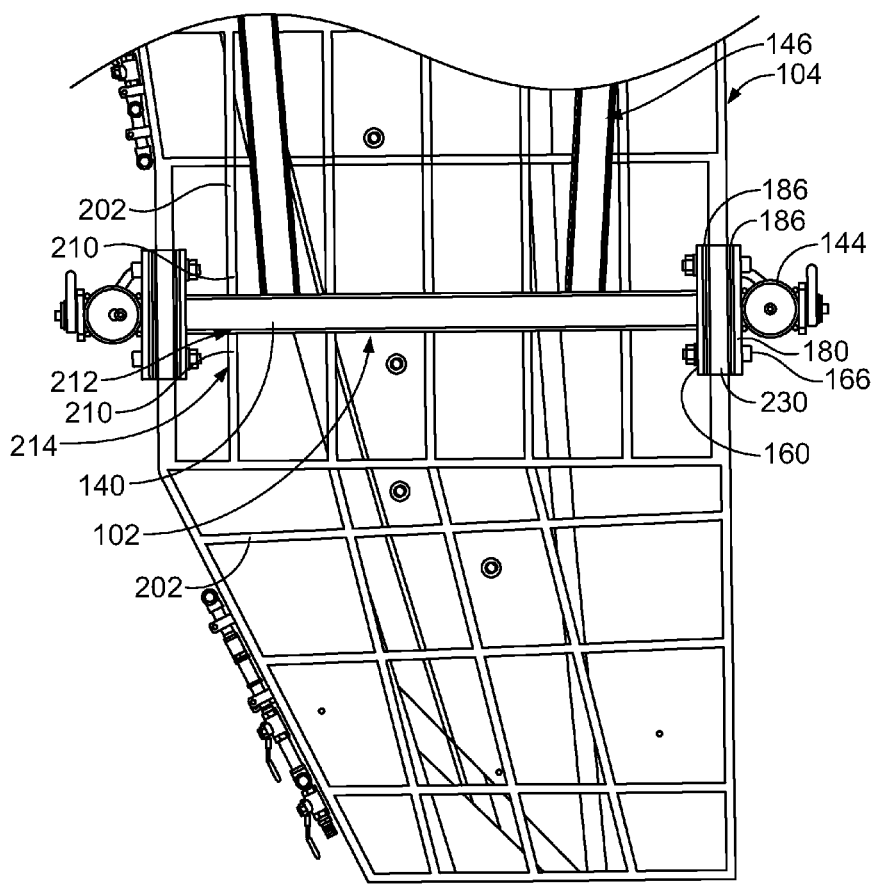
FIG. 23 is a bottom sectional view of a portion of the tool assembly.

FIG. 21 is a sectional view of a portion of the tool assembly 100. FIG. 22 is another sectional view of a portion of the tool assembly 100. FIG. 23 is a bottom sectional view of a portion of the tool assembly 100. The support tool 104 is mounted to the support frame 102. The support grid structure 112 supports the faceplate 110. The faceplate 110 may be relatively thin to reduce material weight and cost. The grid walls 202 are spaced apart an appropriate distance to support the faceplate 110 based on the weight of the working component 106 and the type of manufacturing process being performed. Optionally, the bottom 200 of the faceplate 110 may be curved such that the grid walls 202 have different heights measured between the base plane 208 and the bottom 200 of the faceplate 110.

As shown in FIG. 23, the brackets 214 receive the support beam 140 in the pockets 212. The grid walls 202 may rest directly on the support beam 140 to transfer loads between the support frame 102 and the support tool 104. The mounting pads 230 are connected to the attachment plate 160, 180 using the bolts 166 and the bushings 182. The bushings 182 pass through the wear pads 186 and the mounting pad 230. The bolts 166 pass through the attachment plates 160, 180 and the bushings 182 to secure the mounting pad 230 to the attachment plates 160, 180. As such, loads may be transferred between the support mounts 144, the support beams 140 and the support tool 104.

In an exemplary embodiment, the support tool 104 is removable from the support frame 102. For example, the bolts 166 may be unbolted to remove the support mounts 144 from the support tool 104 and/or from the base frame 146. The support tool 104 may then be lifted off of the base frame 146 and replaced with a different support tool 104, such as a support tool having a different faceplate for supporting a different working component or a different faceplate for performing a different process. The support frame 102 thus defines a common supporting structure for different support tools 104. The various support tools may have common features, such as the layout of the mounting pads 230 and the brace walls 210. As such, the support tools may have common datum points for connecting to the same rigid support frame 102, but may include a different faceplate and a different supporting grid structure with at least some common features for mounting to the support frame 102.

In other various embodiments, some components of the support frame 102 are removable, while other components are not removable. For example, the support mounts 144 may be removable from the base frame 146 and the support tool to be used with a different support tool. In such embodiments, the support mounts may remain mounted to the floor and different support tools transported on different base frames may be interchanged with the support mounts. In other various embodiments, the support tool 104 may be removed from the base frame 146, but the support mounts 144 may remain attached to the support tool 104. In such embodiments, the support mounts 144 may include both attachment plates 160, 180 sandwiching the mounting pad 230 and the interior attachment plates may be attachable to and detachable from the base frame 146. In such embodiments, the base frame is reusable with different support tools 104.

Figure 24:
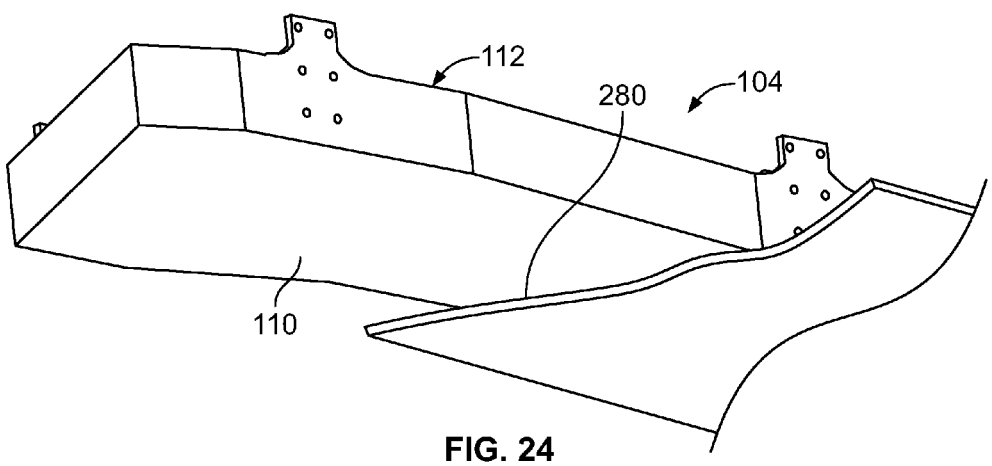
FIG. 24 illustrates the support tool during manufacture.

FIG. 24 illustrates the support tool 104 during manufacture. The support tool 104 is manufactured in a series of additive manufactured layers built on each other to form the support tool 104. In an exemplary embodiment, the support tool 104 is built upside down with the faceplate 110 on a build surface 280. The layers are built up with the supporting grid structure 112 built on the faceplate 110. In an exemplary embodiment, the support tool 104 is manufactured with the faceplate 110 being planar on the planar build surface 280. Portions of the faceplate 110 are later removed to form the desired contoured supporting surface 116 (shown in FIG. 2). After the support tool 104 is formed, the support tool 104 may be connected to the support frame 102 (shown in FIG. 2). Other processes may be used in alternative embodiments to form the support tool 104 as a monolithic structure.

Optionally, the support tool 104 may be formed by embedding smart scepters, such as heating elements, into the AM layers to create an activity heated support tool 104. The support tool may be formed with sensors embedded therein or attached thereto, such as strain gauges for sensing strains in the support tool 104 or position sensors for sensing relative positions and thus deflection amounts for the support tool 104. Optionally, metallic components may be embedded in the support tool to provide structural stiffness to maintain dimensional stability during support tool handling or transportation. Optionally, fiber components, such as sheets, may be embedded in the support tool to improve material properties of the AM material forming the AM layers, such as to enhance structural stiffness to maintain dimensional stability during support tool handling or transportation.

Figure 25:
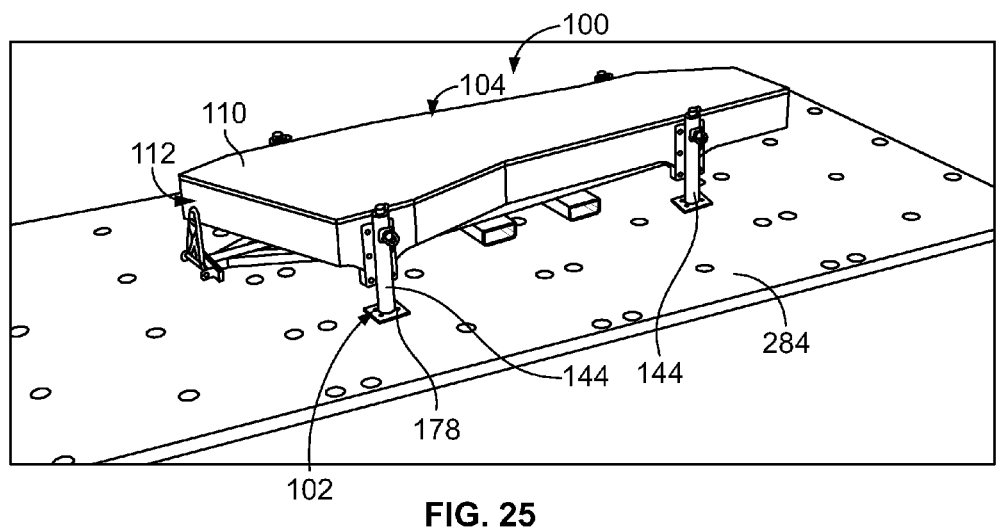
FIG. 25 illustrates the tool assembly mounted to a floor.

FIG. 25 illustrates the tool assembly 100 mounted to a floor 282. The support tool 104 is shown coupled to the support frame 102. The support frame 102 is mounted to the floor 282. For example, the bolt down plates 178 of the support mounts 144 may be bolted to the floor 282. In an exemplary embodiment, after the tool assembly 100 is fixed to the floor 282, the faceplate 110 may be machined to form the supporting surface 116. For example, material of the faceplate 110 may be removed to form the contoured shape of the supporting surface 116.

Figure 26:
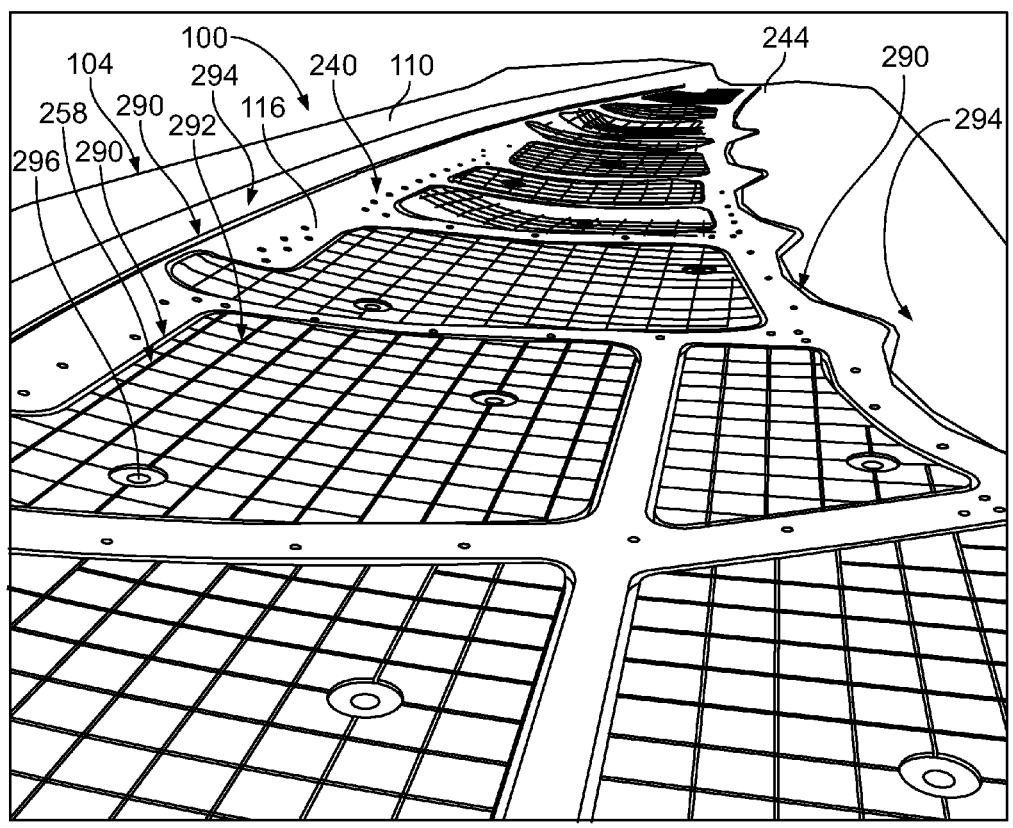
FIG. 26 is a top perspective view of a portion of the tool assembly.
Figure 27:
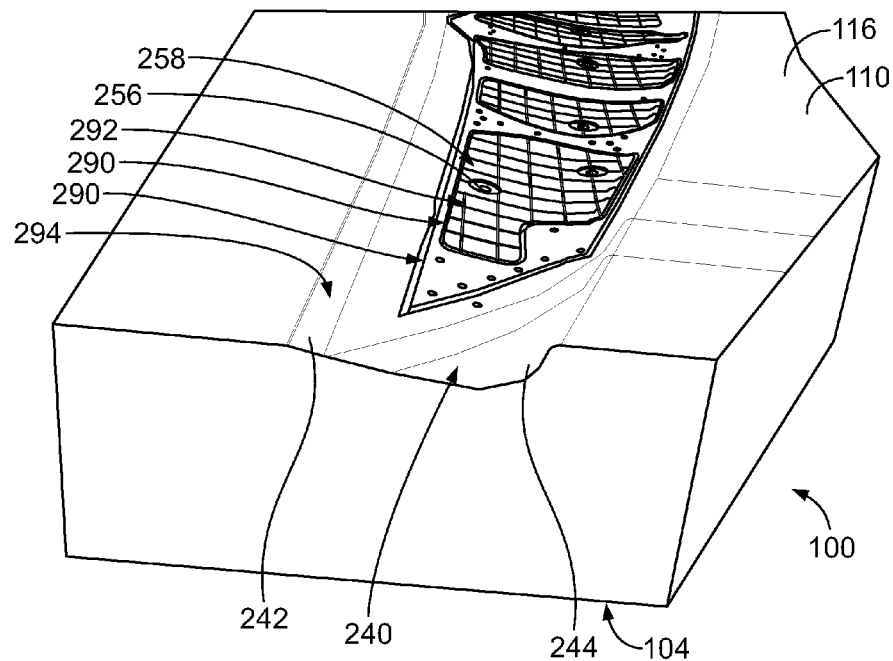
FIG. 27 is a top perspective view of a portion of the tool assembly.

FIG. 26 is a top perspective view of a portion of the tool assembly 100 showing the supporting surface 116 at the front end of the support tool 104. FIG. 27 is a top perspective view of a portion of the tool assembly 100 showing the supporting surface 116 at the rear end of the support tool 104. The well 240 is formed in the faceplate 110 having a complementary shape to the working component 106 (shown in FIG. 1). Seal grooves 290 are machined in the supporting surface 116 to receive the seals 260 (shown in FIG. 14). Optionally, one of the seal grooves 290 may extend the length of the well 240 along the first side 242 while another of the seal grooves 290 may extend the length of the well 240 along the second side 244. Vacuum channels 292 are machined in the vacuum areas 258 to maintain a vacuum pressure in the vacuum areas 258. The vacuum channels 292 are open to corresponding ports 256 such that the vacuum may be dispersed throughout the vacuum area 258.

In an exemplary embodiment, the support tool 104 may include one or more support tool surfaces 294 to support the support tool 108 (shown in FIG. 1) during the manufacturing process. For example, the support tool 108 may be a router and the support tool surface 294 may be a surface along which the router is moved for trimming the working component 106. Other types of support tool surfaces may be provided in alternative embodiments, such as for different types of manufacturing processes.

Figure 28:
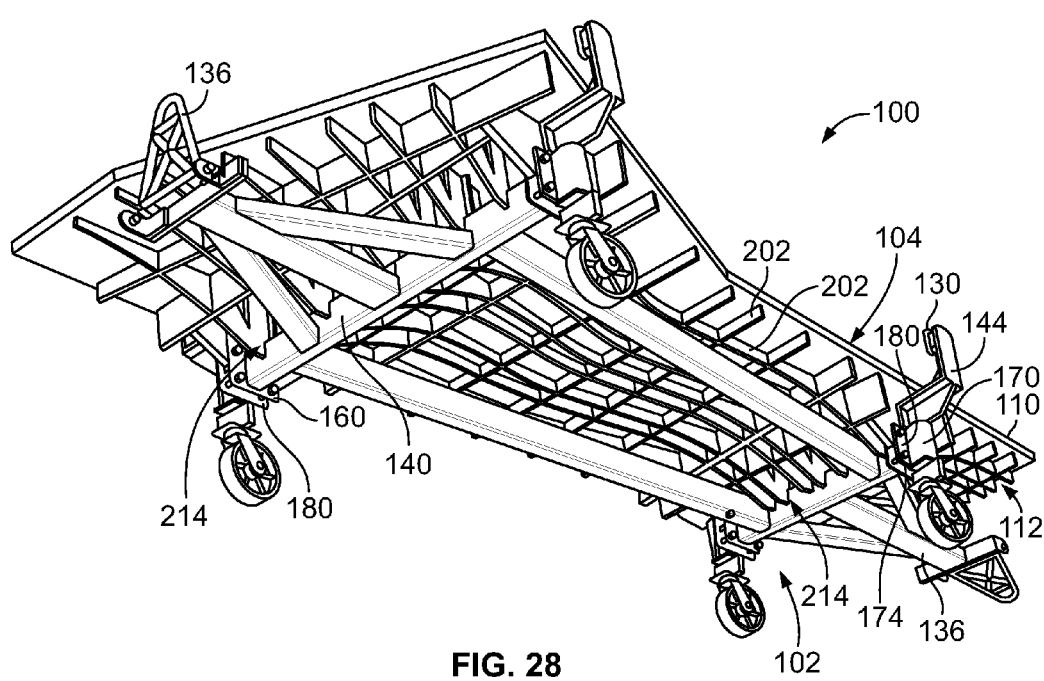
FIG. 28 is a bottom perspective view of the tool assembly in accordance with an exemplary embodiment.

FIG. 28 is a bottom perspective view of the tool assembly 100 in accordance with an exemplary embodiment. The support tool 104 is shaped differently than embodiments shown above. For example, the support tool 104, in the illustrated embodiment, does not include side walls and end walls. In contrast, the grid walls 202 of the supporting grid structure 112 are exposed at the sides and ends of the support tool 104. The grid walls 202 may be thinner than embodiments shown above. The grid walls 202 may have non-uniform heights. The support tool 104 may have reduced material to reduce the cost and weight of the support tool 104. However, the support tool 104 may be more fragile than embodiments having side walls and/or end walls.

The support frame 102 is shaped differently than the support frame illustrated above. However, the support tool 104 may be connected to the support frame 102 in a similar manner as described above, such as connecting the brackets 214 on the support beams 140 and connecting the mounting pads 230 to the attachment plates 160, 180. In the illustrated embodiment, the support mounts 144 are smaller and have fewer connection points. Additionally, each attachment plate 180 is located near the bottom 174 of the post 170. The post 170 includes right angle beams near the top 172 to locate the top 172 and the hoist rings 130 above the faceplate 110. In the illustrated embodiment, the support frame 102 includes tow bars 136 at both the front and the rear of the tool assembly 100.

Figure 29:
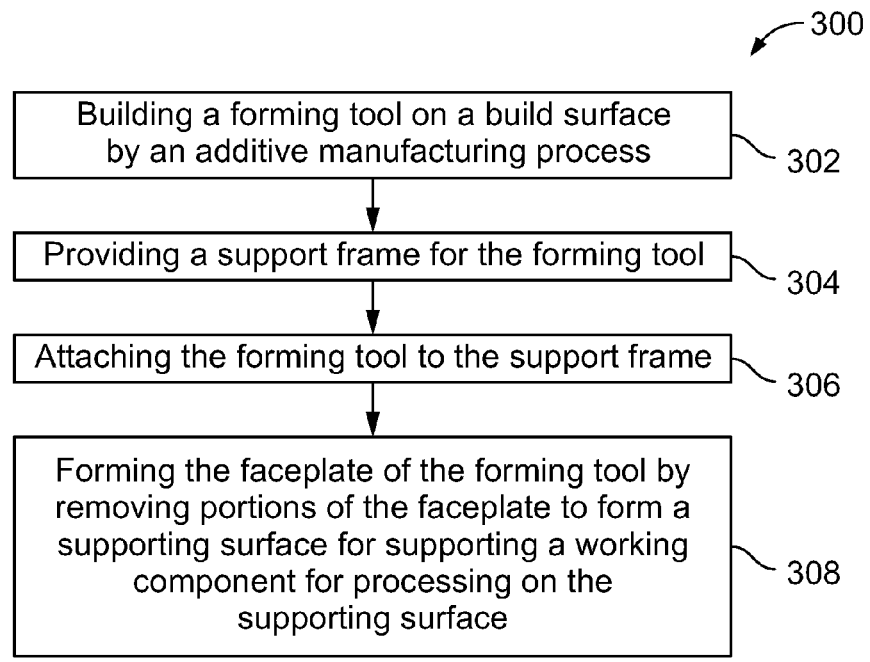
FIG. 29 is a flow chart of one embodiment of a method for manufacturing a tool assembly in accordance with an exemplary embodiment.

FIG. 29 is a flow chart of one embodiment of a method 300 for manufacturing a tool assembly in accordance with the subject matter herein. The method 300 can be performed to manufacture the tool assembly 100 used for processing the working component 106.

At 302, the method includes building a support tool on a build surface by an additive manufacturing process. The additive manufacturing process is used to build up the support tool in layers. For example, during manufacture, the process is used to build a faceplate and the supporting grid structure as a monolithic structure. Optionally, the support tool may be built upside down with the faceplate on the build surface and the supporting grid structure layered above the faceplate. The supporting grid structure includes a plurality of grid walls extending in different directions, such as generally longitudinally and laterally across the faceplate to support the faceplate. Cavities are defined between the grid walls. By forming a grid structure as opposed to a solid structure, the amount of material may be reduced, decreasing the weight and the cost of the support tool. In various embodiments, the layers may be manufactured from a thermoplastic or thermoset polymer material, such as an ABS material. The material may have fillers, such as metal fillers, carbon fillers and the like. Any type of additive manufacturing process may be used, such as fused filament fabrication (FFF), plastic jet printing (PJP), 3-D printing, powder bed processing, selective heat sintering (SHS), and the like. The shape and topology of the layers forming the faceplate and the supporting grid structure may be designed or optimized based on supporting loads of the working component at the surface and supporting loads of the support tool on a support frame.

At 304, the method includes providing a support frame for the support tool. The support frame is rigid and protects the support tool, such as during transportation. In various embodiments, the support frame is provided with support beams, cross beams between the support beams, and support mounts for supporting the support beams. The support mounts may be discrete from the support beams and connected thereto, such as by bolts, clamps, and the like. Alternatively, the support mounts may be extensions of the support beams, welded to the support beams, or integral with the support beams. The support beams may include many attachment points for attaching the support tool to the support frame.

At 306, the method includes attaching the supporting grid structure of the support tool to the support beams such that the support frame rigidly holds the support tool. The support tool may rest directly on the support beams. For example, the grid walls may have brackets formed therewith that may include pockets, which receive and engage the support beams. In various embodiments, the support tool may include mounting pads formed with the supporting grid structure that are connected to the support beams and/or the support mounts. For example, the support beams and the support mounts may include attachment plates connected together by bolts. The mounting pads may be positioned between the attachment plates and the bolts may pass through the mounting pads. The mounting pads may rest on the bolts, or bushings surrounding the bolts, for direct engagement between the support tool and the support frame. Loads or forces may be transferred between the support tool and the support frame at the attachment points where the support tool directly engages the support frame. The support frame provides rigidity to the support tool to maintain dimensional stability of the support tool, such as during transport, and even when resting. The rigid support frame does not allow the support tool to deflect outside of an allowable tolerance of the support tool. The support frame may prevent cracking or damage of the support tool during loading of the support tool, processing of the working component, or transport of the support tool.

At 308, the method includes forming the faceplate of the support tool by removing portions of the faceplate to form a supporting surface for supporting the working component for processing on the supporting surface. The faceplate may be machined to remove portions of the faceplate to form the contoured supporting surface.

Figure 30:
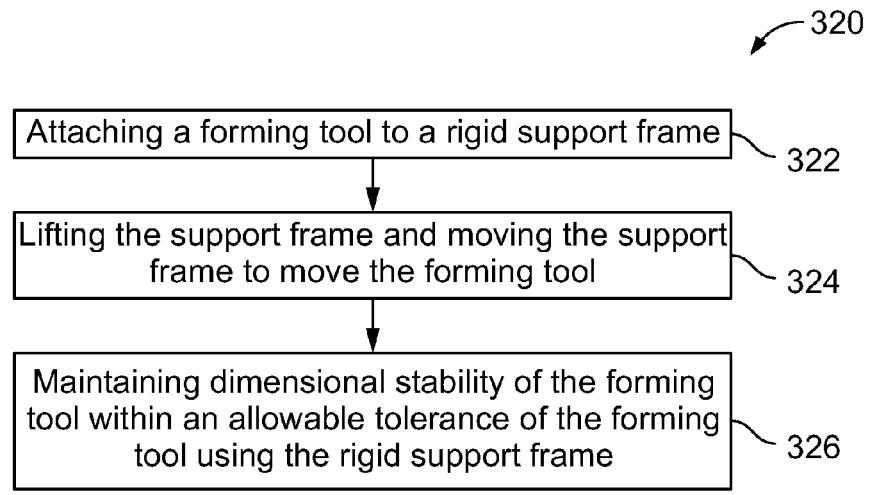
FIG. 30 is a flow chart of one embodiment of a method for transporting a tool assembly in accordance with an exemplary embodiment.

FIG. 30 is a flow chart of one embodiment of a method 320 for transporting a tool assembly in accordance with the subject matter herein. The method 320 can be performed to transport the tool assembly 100 used for processing the working component 106.

At 322, the method includes attaching a support tool to a support frame by coupling a supporting grid structure of the support tool to support beams of the support frame. The support tool may be manufactured by the method described above with reference to FIG. 29. For example, the support tool may be manufactured by an additive manufacturing process used to build up the support tool in layers to build the faceplate and the supporting grid structure as a monolithic structure. The support frame may be manufactured by attaching cross beams between the support beams to provide rigidity to the base frame of the support frame. Support mounts may be connected to the support beams, such as using bolts between attachment plates of the support beams and the support mounts. The bolts may pass through mounting pads of the support tool to attach the support tool to the support frame. The support tool may rest directly on the support beams, such as by forming brackets in the supporting grid structure.

At 324, the method includes lifting the support frame and moving the support frame to move the more fragile support tool. The support frame may include a number of lift points. The support frame transfers the lifting forces to the support tool. The lifting forces are then dissipated through the supporting grid structure to balance the lifting forces across the large area of the support tool. The support frame may include hoist rings for hoisting the support frame, such as using a crane. The support frame may include fork lift sleeves configured to receive forks of a fork lift to transport the tool assembly. The support frame may include castors for rolling the tool assembly along the floor. The support frame may include a tow bar for towing the tool assembly, such as on the castors. At 326, the method includes maintaining dimensional stability of the more fragile support tool within an allowable tolerance of the support tool using the rigid support frame.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A tool assembly comprising:
    a support frame including support beams and support mounts, the support mounts supporting the support beams, the support frame being rigid and used to transport the tool assembly; and
    a support tool supported by the support frame, the support tool having a faceplate and a supporting grid structure formed with the faceplate as a monolithic structure, the faceplate and the supporting grid structure being defined by a series of additive manufactured (AM) layers built on each other with the supporting grid structure being positioned below and supporting the faceplate, the faceplate having a supporting surface at a top of the support tool for supporting a working component, the supporting surface being contoured and defined by a well formed into the AM layers;

wherein the supporting grid structure engages the support beams such that loads are transferred between the support tool and the support frame through the support beams, the support frame maintaining dimensional stability of the support tool during transport and when resting.

2. The tool assembly of claim 1, wherein the support frame maintains the dimensional stability within 0.25 mm of a designed dimension of the supporting surface.

3. The tool assembly of claim 1, wherein the support frame maintains dimensional stability of the support tool based on a material of the support tool and a shape of the support tool.

4. The tool assembly of claim 1, wherein the support tool comprises a thermoplastic or thermoset polymer material and the support frame comprises a metal material having a stiffness greater than the thermoplastic or thermoset polymer material.

5. The tool assembly of claim 1, wherein the supporting grid structure comprises grid walls defining cavities below the faceplate, at least some of the grid walls having brackets at bottom edges of such grid walls, the brackets engaging the support beams.

6. The tool assembly of claim 1, wherein the support tool includes first and second side walls extending a length of the support tool and first and second end walls extending a width of the support tool, the support beams extending widthwise generally between the first and second side walls, a first of the support beams being positioned near the first end wall, a second of the support beams being positioned near the second end wall.

7. The tool assembly of claim 1, wherein the support tool has a depth of at least 20.0 cm, a width of at least 60.0 cm and a length of at least 150.0 cm.

8. The tool assembly of claim 1, wherein the supporting grid structure includes mounting pads engaging the support mounts such that loads are transferred between the support tool and the support mounts through the mounting pads.

9. The tool assembly of claim 8, wherein the support beams include attachment plates and the support mounts include attachment plates, the attachment plates of the support beams being coupled to the attachment plates of corresponding ones of the support mounts via bolts passing through the mounting pads of the supporting grid structure.

10. The tool assembly of claim 1, wherein the support frame comprises cross beams, extending between and connecting the support beams.

11. The tool assembly of claim 10, wherein the cross beams comprise fork-lift sleeves positioned between the support beams, the fork-lift sleeves being configured to receive forks to lift the support frame, lifting forces being transferred from the cross beams to the support beams and from the support beams to the supporting grid structure when the tool assembly is lifted by the forks.

12. The tool assembly of claim 1, wherein the support mounts include hoist rings for hoisting the support frame, lifting forces being transferred from the support mounts to the support beams and from the support beams to the supporting grid structure when the tool assembly is lifted by the hoist rings.

13. The tool assembly of claim 1, further comprising a vacuum assembly configured to provide a vacuum pressure at the supporting surface to hold the working component to the supporting surface.

14. The tool assembly of claim 1, wherein the faceplate comprises a seal layer at the supporting surface configured to maintain a vacuum pressure at the supporting surface, the seal layer being non-hygroscopic.

15. The tool assembly of claim 1, wherein the supporting surface supports the working component for trimming the working component to form an aircraft wing component.

16. The tool assembly of claim 1, wherein the supporting surface is configured to support the working component for pressing the working component to form an aircraft wing component.

17. A tool assembly comprising:
a support frame including support beams, cross beams and support mounts, the support mounts supporting the support beams, the cross beams extending between the support beams, the support frame being rigid and used to transport the tool assembly, the support mounts each having a hoist ring for hoisting the support frame during transport, the cross beams having fork-lift sleeves for receiving forks of a fork lift for lifting the support frame during transport, wherein lifting forces induced to the support frame through the hoist rings or through the fork-lift sleeves are transferred to the support beams; and
a support tool supported by the support frame, the support tool having a faceplate and a supporting grid structure formed with the faceplate as a monolithic structure, the faceplate having a supporting surface at a top of the support tool for supporting a working component, wherein the supporting grid structure engages the support beams such that loads are transferred between the support tool and the support frame through the support beams, the lifting forces being transferred from the support beams to the supporting grid structure and being spread through the support tool by the supporting grid structure.

18. The tool assembly of claim 17, wherein the support mounts each include bolt down plates configured to bolt down the support mounts to at least one of a floor and a caster.

19. The tool assembly of claim 17, wherein the support frame further comprises a tow bar attached to at least one of the support beams for towing the support frame during transportation.

20. The tool assembly of claim 17, wherein the supporting grid structure is connected to the support frame such that the support frame maintains dimensional stability of the support tool during transport and when resting.

21. A tool assembly comprising:
a metal support frame including support beams, cross beams and support mounts, the cross beams connecting between and fixing the support beams in position relative to each other, each of the support beams extending between a first end and a second end, the support mounts being provided at and supporting the support beams at the first and second ends, each of the support beams including a plurality of attachment points along a top thereof, the metal support frame being rigid and used to transport the tool assembly; and
a support tool removably coupled to the metal support frame, the support tool being supported by the metal support frame, the support tool having a faceplate and a supporting grid structure formed with the faceplate as a monolithic structure, the faceplate having a supporting surface at a top of the support tool for supporting a working component, wherein the supporting grid structure engages the support beams at the attachment points such that loads are transferred between the support tool and the metal support frame through the support beams;

wherein the support tool is removable from the metal support frame such that a different support tool having a different faceplate for supporting a different working component are configured to be assembled to and supported by the metal support frame, the metal support frame defining a common supporting structure for different support tools.

22. The tool assembly of claim 21, wherein the supporting grid structure includes a plurality of grid walls having bottom edges, at least some of the grid walls having brackets configured to engage corresponding ones of the support beams, the brackets being removable from the support beams during removal of the support tool from the metal support frame.

23. The tool assembly of claim 21, wherein the supporting grid structure includes mounting pads configured to be received between attachment plates of the support beams and the support mounts, the attachment plates being connected using bolts passing through the mounting pads, the mounting pads being removable from the attachment plates after the bolts are removed to allow removal of the support tool from the metal support frame.

24. A method of transporting a tool assembly using a support tool having a faceplate and a supporting grid structure formed with the faceplate as a monolithic structure, the faceplate and the supporting grid structure being defined by a series of additive manufactured (AM) layers built on each other with the supporting grid structure being positioned below and supporting the faceplate, the faceplate having a supporting surface at a top of the support tool for supporting a working component, the supporting surface being contoured and defined by a well formed into the AM layers, the method comprising:

attaching the support tool to a support frame by coupling the supporting grid structure to support beams, wherein the support frame includes the support beams and support mounts, the support mounts supporting the support beams, the support frame being rigid;

lifting the support frame and moving the support frame to move the support tool; and using the support frame to maintain dimensional stability of the support tool during transport.

25. The method of claim 24, wherein the support tool directly engages the support beams to transfer loads from lifting forces from the support frame to the support tool.

26. The method of claim 24, further comprising attaching the support mounts to the support beams using bolts between attachment plates of the support mounts and the support beams, and wherein the bolts pass through bushings, positioned in the supporting grid structure, and loads, resulting from lifting forces from the support frame, are transferred to the support tool through the bushings.

27. A method of manufacturing a tool assembly used for processing a working component, the method comprising:

building a support tool on a build surface by an additive manufacturing process, wherein the support tool is built upside-down with a faceplate of the support tool on the build surface, the support tool being built to include a supporting grid structure for the faceplate as a monolithic structure with the faceplate;

attaching the supporting grid structure to support beams of a support frame such that the support frame rigidly holds the support tool, the support frame including the support beams and support mounts, the support mounts supporting the support beams; and forming the faceplate of the support tool by removing portions of the faceplate to form a supporting surface for supporting the working component, the working component being processed on the supporting surface.

28. The method of claim 27, wherein the supporting grid structure includes brackets, the method including attaching the supporting grid structure to the support beams by connecting the brackets to the support beams to transfer loads from lifting forces from the support frame to the support tool.

29. The method of claim 27, wherein the supporting grid structure includes mounting pads and the support beams and the support mounts both include attachment plates connected using bolts, the method including attaching the supporting grid structure to the support from by positioning the mounting pads between the attachment plates such that the bolts pass through the mounting pads.

* * * * *